United States Patent
Onoue et al.

(10) Patent No.: US 10,406,762 B2
(45) Date of Patent: Sep. 10, 2019

(54) CARBON-FIBER-REINFORCED RESIN COMPOSITE MATERIAL

(71) Applicant: Teijin Limited, Osaka-Shi, Osaka (JP)

(72) Inventors: Shuhei Onoue, Osaka (JP); Makoto Ootsubo, Osaka (JP); Yasunori Nagakura, Osaka (JP); Naoaki Sonoda, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 17 days.

(21) Appl. No.: 15/706,853

(22) Filed: Sep. 18, 2017

(65) Prior Publication Data

US 2018/0001577 A1 Jan. 4, 2018

Related U.S. Application Data

(63) Continuation of application No. PCT/JP2016/057624, filed on Mar. 10, 2016.

(30) Foreign Application Priority Data

Mar. 24, 2015 (JP) .................. 2015-060975

(51) Int. Cl.
*B29C 70/18* (2006.01)
*C08J 5/04* (2006.01)
(Continued)

(52) U.S. Cl.
CPC .............. *B29C 70/18* (2013.01); *B29C 70/12* (2013.01); *B29C 70/305* (2013.01);
(Continued)

(58) Field of Classification Search
CPC ........ D04H 1/74; D04H 1/4242; D04H 1/724; D04H 1/70; B29K 2101/12; B29K 101/10;
(Continued)

(56) References Cited

U.S. PATENT DOCUMENTS

2015/0044455 A1  2/2015  Konagai et al.

FOREIGN PATENT DOCUMENTS

| JP | H05-195396 A | 8/1993 |
| JP | H08-232187 A | 9/1996 |

(Continued)

OTHER PUBLICATIONS

Jun. 7, 2016—(PCT/JP) Written Opinion of the International Searching Authority—App 2016/057624—Eng Tran.
(Continued)

*Primary Examiner* — Camie S Thompson
(74) *Attorney, Agent, or Firm* — Banner & Witcoff, Ltd.

(57) ABSTRACT

A carbon-fiber-reinforced resin composite material includes: carbon fibers including carbon fiber bundles and a thermoplastic resin, in which (1) a coefficient of variation (CV1) of a total areal weight of the carbon-fiber-reinforced resin composite material is 10% or lower, (2) a coefficient of variation (CV2) of a carbon fiber volume fraction (Vf) in the carbon-fiber-reinforced resin composite material which is defined by Expression (a) is 15% or lower, and (3) a weight average fiber length of the carbon fibers is 1 to 100 mm.

Carbon Fiber Volume Fraction $(Vf)=100 \times$ Volume of Carbon Fibers/(Volume of Carbon Fibers+Volume of Thermoplastic Resin)    Expression (a).

11 Claims, 2 Drawing Sheets

(51) Int. Cl.
  *B29K 101/12* (2006.01)
  *B29C 70/12* (2006.01)
  *B29C 70/50* (2006.01)
  *B29C 70/30* (2006.01)

(52) U.S. Cl.
  CPC ............. *B29C 70/502* (2013.01); *C08J 5/042*
           (2013.01); *B29K 2101/12* (2013.01)

(58) Field of Classification Search
  CPC ......... B29C 70/12; B29C 70/18; B29C 70/10;
         B29C 70/305; B29C 70/502; B29C 67/14;
         B29C 70/06; C08J 5/042; C08J 5/04
  USPC ............................... 156/327; 428/402, 297.4
  See application file for complete search history.

(56) References Cited

FOREIGN PATENT DOCUMENTS

| | | |
|---|---|---|
| JP | 2014-040088 A | 3/2014 |
| JP | 2014-210991 A | 11/2014 |
| WO | 2012-086682 A1 | 6/2012 |
| WO | 2012-140793 A1 | 10/2012 |

OTHER PUBLICATIONS

Apr. 20, 2018—(EP) Office Action—App 16768466.1.
Nov. 1, 2016—(JP) Office Action—App 2016-555842.
Jun. 7, 2016—International Search Report—Intl App PCT/JP2016/057624.

CARBON-FIBER-REINFORCED RESIN COMPOSITE MATERIAL

CROSS REFERENCE TO RELATED APPLICATION(S)

This application is a continuation application of International Patent Application No. PCT/JP2016/057624 filed on Mar. 10, 2016 and claims priority under 35 U.S.C. 119 from Japanese Patent Application No. 2015-060975 filed on Mar. 24, 2015.

TECHNICAL FIELD

The present invention relates to a carbon-fiber-reinforced resin composite material which can exhibit excellent moldability and mechanical properties even in a small shaped product or a shaped product having a complex shape by suppressing unevenness in shape and mechanical properties during molding at a small pitch.

BACKGROUND ART

A composite material which is reinforced by carbon fibers has been widely used as a structural material of an airplane or a vehicle, or as materials in the general or sport industry such as a tennis racket, a golf shaft, or a fishing rod due to its high specific strength and high specific elasticity. Examples of the form of carbon fibers used for these materials include woven fabric which is formed using continuous fibers, an UD sheet in which fibers are unidirectionally arranged, a random sheet which is formed using cut fibers (discontinuous fibers), and non-woven fabric.

Recently, a composite material in which a thermoplastic resin is used as a matrix instead of a thermosetting resin of the related art has attracted attention. For example, a molding method is developed including: heating a carbon-fiber-reinforced resin composite material impregnated with carbon fibers and a thermoplastic resin to a softening point of the thermoplastic resin or higher; putting the resin material into a mold whose temperature is adjusted to a melting point or lower or a glass transition temperature or lower; and shaping the resin material by mold clamping. A carbon-fiber-reinforced resin composite material having a small unevenness in areal weight is also developed (Patent Documents 1 and 2).

Patent Document 1 describes a method of obtaining a shaped product including: impregnating a thermoplastic resin with continuous carbon fibers, which are unidirectionally arranged, to obtain a thermoplastic resin prepreg; cutting the thermoplastic resin prepreg into short pieces; and press-molding the short pieces. According to Patent Document 1, the unevenness in areal weight can be suppressed by using carbon fibers having a specific average single fiber fineness and a specific roundness.

Patent Document 2 describes a method of obtaining a papermaking base material having an excellent dispersed state of reinforcing fibers and a small unevenness in areal weight at a low cost. According to Patent Document 2, by precisely controlling the addition of carbon fibers during papermaking using a specific method, the papermaking base material having an excellent dispersed state of reinforcing fibers and a small unevenness in areal weight can be prepared.

PATENT DOCUMENT

[Patent Document 1]: JP-A-2013-203942
[Patent Document 2]: JP-A-2011-157637

SUMMARY OF INVENTION

Problem to be Solved by Invention

However, in the inventions described in Patent Documents 1 and 2, the unevenness in the areal weight of the carbon-fiber-reinforced resin composite material is not sufficiently reduced, and the unevenness in carbon fiber volume fraction (Vf) is not controlled. For example, in the thermoplastic resin prepreg described in Patent Document 1, the unevenness in areal weight at a wide pitch of 200 mm×200 mm can be suppressed, but the unevenness in areal weight at a narrow pitch (25 mm×25 mm) cannot be controlled. Further, the prepared prepreg is temporarily cut into pieces, and these pieces are molded. Therefore, the unevenness in areal weight may increase in a step of dispersing the cut pieces in a mold. Regarding the papermaking base material described in PATENT DOCUMENT 2, the unevenness in areal weight at a wide pitch of 50 mm×50 mm can be suppressed in a width direction or in a longitudinal direction. However, the unevenness in areal weight at a narrow pitch in a wide range is not reduced. In particular, when a small component or a complex component is obtained by molding, a carbon-fiber-reinforced resin composite material having a small unevenness in areal weight and carbon fiber volume fraction (Vf) even at a narrow pitch is required.

An object of the present invention is to provide a carbon-fiber-reinforced resin composite material which can exhibit excellent moldability and mechanical properties even in a small shaped product or a shaped product having a complex shape by suppressing unevenness in shape and mechanical properties during molding at a small pitch.

Solution to Problem

In order to achieve the above-described object, the present invention provides the following means [1] to [8].

[1] A carbon-fiber-reinforced resin composite material including:
carbon fibers that includes a carbon fiber bundle; and
a thermoplastic resin,
in which (1) a coefficient of variation (CV1) of a total areal weight of the carbon-fiber-reinforced resin composite material is 10% or lower,
(2) a coefficient of variation (CV2) of a carbon fiber volume fraction (Vf) in the carbon-fiber-reinforced resin composite material which is defined by Expression (a) is 15% or lower, and
(3) a weight average fiber length of the carbon fibers is 1 to 100 mm, $$\text{Carbon Fiber Volume Fraction }(Vf) = 100 \times \text{Volume of Carbon Fibers}/(\text{Volume of Carbon Fibers} + \text{Volume of Thermoplastic Resin}) \quad \text{Expression (a).}$$

[2] The carbon-fiber-reinforced resin composite material according to [1], having a form of a single layer having a thickness of 0.3 mm or more.

[3] The carbon-fiber-reinforced resin composite material according to [1] or [2],
in which the coefficient of variation (CV1) of the total areal weight of the carbon-fiber-reinforced resin composite material is 5% or lower, and the coefficient of variation (CV2) of the carbon fiber volume fraction (Vf) in the carbon-fiber-reinforced resin composite material is 10% or lower.

[4] The carbon-fiber-reinforced resin composite material according to any one of [1] to [3], in which in the carbon fibers included in the carbon-fiber-reinforced resin composite material, a proportion of a carbon fiber bundle (A) including a critical number of single fibers defined by Expression (b) or more with respect to the total amount of the carbon fibers is 20 to 99 vol %, and a coefficient of variation (CV3) of a volume fraction of the carbon fiber bundle (A) is 10% or lower, $$\text{Critical Number of Single Fibers}=600/D \qquad \text{Expression (b)}$$

wherein D represents an average fiber diameter (μm) of the carbon fibers.

[5] The carbon-fiber-reinforced resin composite material according to any one of [1] to [4], in which the total areal weight is 50 to 20000 g/m$^2$.

[6] The carbon-fiber-reinforced resin composite material according to any one of [1] to [5], in which the carbon fiber volume fraction (Vf) is 10% to 60%.

[7] The carbon-fiber-reinforced resin composite material according to any one of [1] to [6], which is used for press-molding.

[8] The carbon-fiber-reinforced resin composite material according to any one of [1] to [7], which is manufactured using an airlaid method.

[9] A method of manufacturing a carbon-fiber-reinforced resin composite material according to any one of [1] to [8], in which the carbon-fiber-reinforced resin composite material is manufactured through a random mat, the method including:

(i) spraying carbon fibers and a thermoplastic resin in a breathable support, which is continuously transported in one direction, through a tube body unit including a plurality of tube bodies;

(ii) manufacturing a random mat: by providing the tube bodies with a phase difference in a transport direction of the breathable support and/or a direction perpendicular to the transport direction of the breathable support; by swinging the tube body unit; or by leveling the carbon fibers and the thermoplastic resin, which are sprayed through the tube bodies, through mechanical processing; and (iii) performing an impregnation treatment on the random mat under pressure and heating.

Advantageous Effects of Invention

According to the present invention, the carbon-fiber-reinforced resin composite material having a small unevenness in total areal weight and carbon fiber volume fraction (Vf) even at a small pitch is provided. In a case where the carbon-fiber-reinforced resin composite material according to the present invention is used, the unevenness in shape and mechanical properties during molding can be suppressed at a small pitch. Therefore, excellent moldability and mechanical properties can be exhibited even in a small shaped product or a shaped product having a complex shape.

In addition, in a case where the carbon-fiber-reinforced resin composite material according to the present invention is used, the external appearance of a shaped product after molding can be improved.

DESCRIPTION OF EMBODIMENTS

Figure 1A:
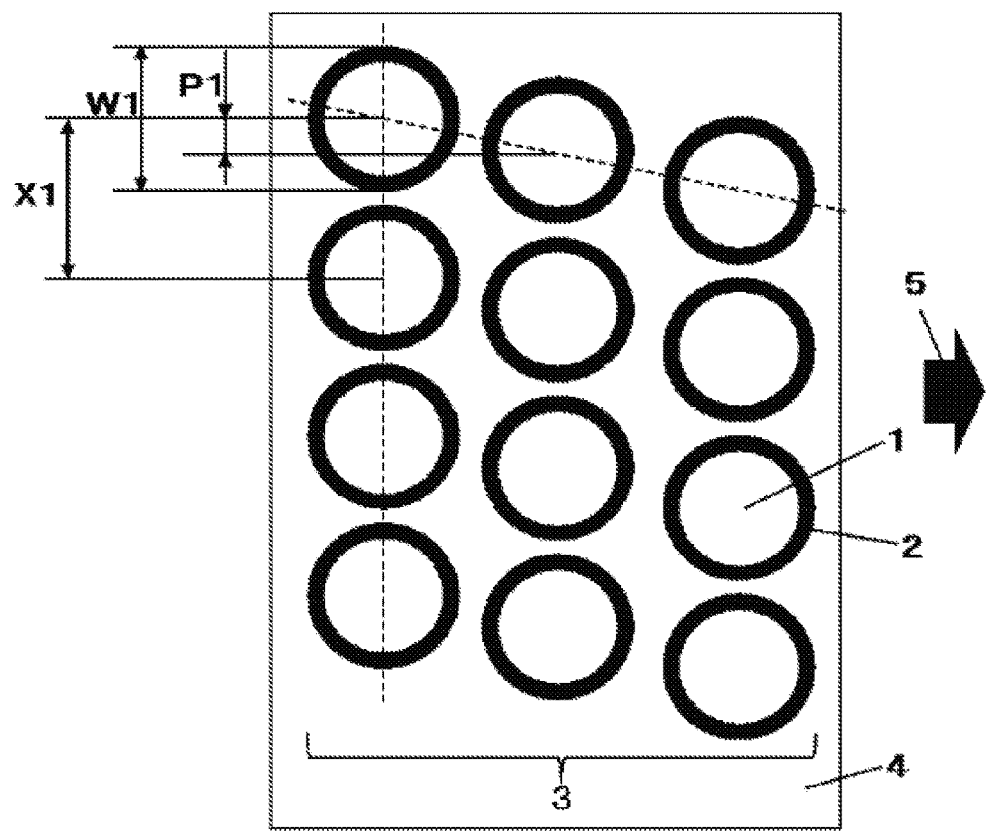
FIG. 1A is a schematic diagram (top view) showing a tube body unit.

A carbon-fiber-reinforced resin composite material according to the present invention includes: carbon fibers that includes a carbon fiber bundle; and a thermoplastic resin, in which (1) a coefficient of variation (CV1) of a total areal weight of the carbon-fiber-reinforced resin composite material is 10% or lower, (2) a coefficient of variation (CV2) in a carbon fiber volume fraction (Vf) of the carbon-fiber-reinforced resin composite material which is defined by Expression (a) is 15% or lower, and (3) a weight average fiber length of the carbon fibers is 1 to 100 mm.

$$\text{Carbon Fiber Volume Fraction }(Vf)=100\times\text{Volume of Carbon Fibers}/(\text{Volume of Carbon Fibers}+\text{Volume of Thermoplastic Resin}) \qquad \text{Expression (a)}$$

[Carbon Fiber]

As the carbon fibers, for example, polyacrylonitrile (PAN) carbon fibers, petroleum and coal pitch carbon fibers, rayon carbon fibers, cellulose carbon fibers, lignin carbon fibers, phenol carbon fibers, or vapor-grown carbon fibers are known. In the present invention, among the above-described carbon fibers, any kind of carbon fibers can be preferably used.

Among these, in the present invention, polyacrylonitrile (PAN) carbon fibers are preferably used from the viewpoint of obtaining an excellent tensile strength. In a case where the PAN carbon fibers are used as the carbon fibers, the tensile modulus thereof is preferably in a range of 100 to 600 GPa, more preferably in a range of 200 to 500 GPa, and still more preferably in a range of 230 to 450 GPa. In addition, the tensile strength is preferably in a range of 2000 to 10000 MPa and, more preferably in a range of 3000 to 8000 MPa.

A sizing agent may be attached to surfaces of the carbon fibers used in the present invention. In a case where the carbon fibers to which the sizing agent is attached are used, the kind of the sizing agent can be appropriately selected depending on the kinds of the carbon fibers and a matrix resin without any particular limitation.

[Form of Carbon Fibers]

(Fiber Length)

The carbon fibers used in the present invention are discontinuous carbon fibers, and the weight average fiber length thereof may be 1 to 100 mm. The weight average fiber length of the discontinuous carbon fibers is more preferably 3 to 80 mm, and still more preferably 5 to 60 mm. Upper limit of the weight average fiber length of the discontinuous carbon fibers is preferably less than 60 mm, and more preferably less than 50 mm, and still more preferably less than 40 mm. In a case where the weight average fiber length is more than 100 mm, the fluidity of the carbon-fiber-reinforced resin composite material deteriorates, and thus a desired shaped product shape may not be obtained during press-molding or the like. On the other hand, in a case where the weight average fiber length is less than 1 mm, the mechanical strength of the carbon-fiber-reinforced resin composite material deteriorates.

In the present invention, carbon fibers having different fiber lengths may be used in combination. In other words, the weight average fiber length of the carbon fibers used in the present invention may have a single peak or a plurality of peaks.

The average fiber length of the carbon fibers can be obtained based on the following Expression (f) after measuring the fiber lengths of 100 fibers, which are arbitrarily extracted from the carbon-fiber-reinforced resin composite material, using a caliper or the like in units of 1 mm. In the measurement of the average fiber length, the weight average fiber length (Lw) is measured. When the fiber length of each carbon fiber is represented by Li, and when the number of measured carbon fibers is represented by j, the number average fiber length (Ln) and the weight average fiber length (Lw) are obtained from the following Expressions (e) and (f).

$$Ln=\Sigma Li/j \qquad \text{Expression (e)}$$

$$Lw=(\Sigma Li^2)/(\Sigma Li) \qquad \text{Expression (f)}$$

In a case where the fiber lengths are fixed, the number average fiber length and the weight average fiber length are the same.

The carbon fibers can be extracted from the carbon-fiber-reinforced resin composite material, for example by heating the carbon-fiber-reinforced resin composite material at 500° C. for 1 hour to remove the resin therefrom in a furnace.

(Fiber Diameter)

Regarding the fiber diameter of the carbon fibers used in the present invention, typically, the average fiber diameter is preferably in a range of 3 to 50 μm, more preferably in a range of 4 to 12 μm, and still more preferably in a range of 5 to 8 μm.

Here, the average fiber diameter refers to the average diameter of single fibers of the carbon fibers. Therefore, in a case where the carbon fibers are in the form of a fiber bundle, the average fiber diameter refers to not the diameter of the fiber bundle but the average diameter of carbon fibers (single fibers) constituting the fiber bundle. The average fiber diameter of the carbon fibers can be measured using a method described in JIS R-7607:2000.

(Carbon Fiber Bundle)

The carbon fibers used in the present invention includes a carbon fiber bundle, and this carbon fiber bundle refers to a bundle in which two or more single fibers are adjacent to each other using a sizing agent, an electrostatic force, or the like. However, the carbon fibers used in the present invention may include single fibers, and single fibers and fiber bundles may be present together.

Regarding the carbon fibers in the form of a fiber bundle, the number of single fibers constituting each fiber bundle may be the same as or different from that constituting another fiber bundle. The number of single fibers constituting each fiber bundle is not particularly limited and is typically in a range of 20000 to 100000.

(Preferable Carbon Fiber Bundle)

In a case where a fiber bundle is opened and used, the opening degree of the opened fiber bundle is not particularly limited. It is preferable that the opening degree of the fiber bundle is controlled and that the carbon fibers include a carbon fiber bundle including a specific number or more of carbon fibers and include less than the specific number of single fibers or a carbon fiber bundle including less than the specific number of single fibers. In this case, specifically, it is preferable that the carbon fibers include a carbon fiber bundle (A) including a critical number of single fibers defined by the following Expression (b) or more and opened carbon fibers (B) other than the carbon fiber bundle (A), the opened carbon fibers (B) being in the form of single fibers or a fiber bundle including less than the critical number of single fibers.

$$\text{Critical Number of Single Fibers}=600/D \qquad \text{Expression (b)}$$

(wherein D represents the average fiber diameter (μm) of the carbon fibers).

Further, in the present invention, a proportion of the carbon fiber bundle (A) with respect to the total amount of the carbon fibers in the carbon-fiber-reinforced resin composite material is preferably 20 to 99 vol %, more preferably 30 to 95 vol %, and still more preferably 50 vol % or higher and lower than 90 vol %. In a case where the proportion of the carbon fiber bundle (A) with respect to the total amount of the carbon fibers is 20 vol % or higher, the carbon fiber volume fraction (Vf) in the carbon-fiber-reinforced resin composite material is likely to be improved, and thus desired mechanical properties are likely to be obtained. In addition, the abundance of carbon fibers in the form of single fibers is relatively small, and thus the formability during molding is improved. On the other hand, in a case where the proportion of the carbon fiber bundle (A) is not higher than 99 vol %, the width of the carbon fiber bundle is not increased, a ratio (aspect ratio) of the fiber length to the width of the fiber bundle can be secured, and thus desired mechanical properties are likely to be obtained.

The opening degree of the carbon fibers can be made to be in a desired range, for example, by adjusting opening conditions of the fiber bundle such as a pressure under which air blows in an opening step.

In the present invention, the average number (N) of fibers in the carbon fiber bundle (A) can be appropriately determined without any particular limitation in a range where the object of the present invention can be achieved, and it is preferable that the average number (N) of fibers satisfies the following Expression (c).

$$0.6\times10^4/D^2<N<6\times10^5/D^2 \qquad \text{Expression (c)}$$

(wherein D represents the average fiber diameter (μm) of the carbon fibers).

The average number (N) of fibers in the carbon fiber bundle (A) can be adjusted to be in the above-described range by adjusting the size of the fiber bundle, for example, the width of the fiber bundle or the number of fibers per width using a preferable method described below. Specifically, in a case where the average fiber diameter of the carbon fibers in the carbon-fiber-reinforced resin composite material is 5 to 7 μm, the critical number of single fibers is 86 to 120. In a case where the average fiber diameter of the carbon fibers is 5 μm, the average number (N) of fibers in the carbon fiber bundle is preferably 240 to 24000, more preferably 300 to 10000, and still more preferably 500 to 5000. In a case where the average fiber diameter of the carbon fibers is 7 μm, the average number (N) of fibers in the carbon fiber bundle is preferably 122 to 12200, more preferably 200 to 5000, and still more preferably 300 to 3000. In a case where the average number (N) of fibers in the carbon fiber bundle (A) is $0.6\times10^4/D^2$ or more, the carbon fiber volume fraction (Vf) in the carbon-fiber-reinforced resin composite material is likely to be improved, and thus desired mechanical properties are likely to be obtained. On the other hand, in a case where the average number (N) of fibers in the carbon fiber bundle (A) is $6\times10^5/D^2$ or less, a locally thick portion is not likely to be formed, and voids are not likely to be formed in the carbon-fiber-reinforced resin composite material.

[Form of Random Mat]

Figure 1B:
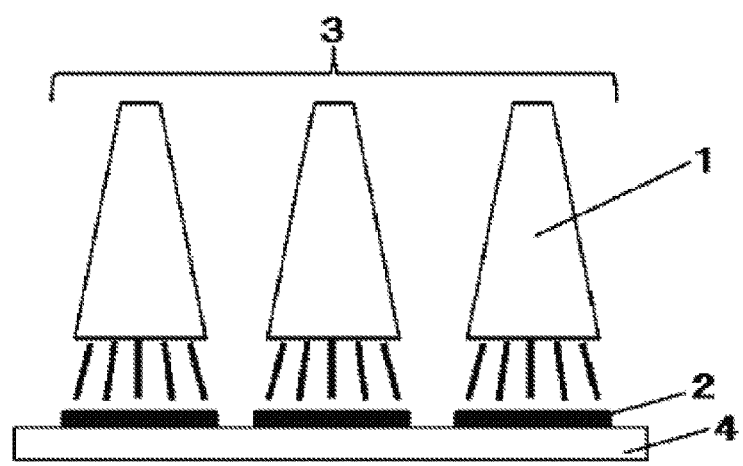
FIG. 1B is a schematic diagram (side view) showing the tube body unit.

The carbon-fiber-reinforced resin composite material according to the present invention has a preferable structure by performing an impregnation treatment on the random mat including the carbon fibers and the thermoplastic resin. The random mat (2 in FIGS. 1A and 1B) includes: a carbon fiber mat that includes a carbon fiber bundle including discontinuous carbon fibers having a predetermined weight average fiber length; and a thermoplastic resin. This random mat is a precursor of the carbon-fiber-reinforced resin composite material. In the carbon fiber mat, the carbon fibers are randomly oriented, and it is preferable that the unevenness in mechanical properties in an in-plane horizontal direction is substantially small. In the carbon fiber mat, it is preferable that the carbon fibers are two-dimensionally randomly oriented.

Regarding the form of the thermoplastic resin in the random mat, the thermoplastic resin in the form of a powder, a fiber, or an aggregate may be included in the carbon fiber mat, the thermoplastic resin in the form of a sheet or a film may be mounted or laminated on the carbon fiber mat, or the thermoplastic resin in the form of a sheet or a film may be molten. A method of manufacturing the random mat is not particularly limited. The random mat can be manufactured using an airlaid method, a carding method, a papermaking method, or the like and is preferably manufactured using an airlaid method. In a carding method, the carbon fibers are likely to be unidirectionally arranged and are not likely to be two-dimensionally randomly oriented. In addition, in a papermaking method, a relatively large amount of carbon fibers in the form of single fibers are present. Therefore, the formability during molding may deteriorate, or in a case where a random mat having a large areal weight is manufactured, the unevenness may increase. A specific procedure of the airlaid method will be described below.

The two-dimensional random orientation of the carbon fibers in the carbon-fiber-reinforced resin composite material can be verified, for example, by measuring the tensile modulus in a tensile test in which an arbitrary direction of the carbon-fiber-reinforced resin composite material and a direction perpendicular to the arbitrary direction are set as references, and then measuring a ratio (Eδ) which is obtained by dividing a high value by a low value among the measured tensile modulus values. As the tensile modulus ratio approaches 1, it can be evaluated that the carbon fibers are more likely to be two-dimensionally randomly oriented. In a case where the ratio, which is obtained by dividing a high value by a low value among the tensile modulus values in the two directions perpendicular to each other, is not higher than 2, the carbon fibers are evaluated as being isotropic. In a case where this ratio is not higher than 1.3, the carbon fibers are evaluated as being highly isotropic.

In addition, in a case where the carbon fiber resin composite material according to the present invention is used, the above-described range can be more stably satisfied. That is, in the carbon-fiber-reinforced resin composite material according to the present invention, high isotropy can be realized at all the positions in the entire width direction.

[Thermoplastic Resin]

The thermoplastic resin used in the present invention is not particularly limited as long as the carbon-fiber-reinforced resin composite material having desired mechanical properties can be obtained. The thermoplastic resin can be appropriately selected depending on the intended use or the like of a shaped product to be prepared. The thermoplastic resin is not particularly limited, and any thermoplastic resin having a desired softening point or melting point can be appropriately selected depending on the intended use or the like of the carbon-fiber-reinforced resin composite material. Typically, a thermoplastic resin having a softening point in a range of 180° C. to 350° C., but the present invention is not limited thereto.

Examples of the thermoplastic resin include a polyolefin resin, a polystyrene resin, a polyamide resin, a polyester resin, a polyacetal resin (polyoxymethylene resin), a polycarbonate resin, a (meth)acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluororesin, and a thermoplastic polybenzimidazole resin.

Examples of the polyolefin resin include a polyethylene resin, a polypropylene resin, a polybutadiene resin, a polymethyl pentene resin, a vinyl chloride resin, a vinylidene chloride resin, a vinyl acetate resin, and a polyvinyl alcohol resin. Examples of the polystyrene resin include a polystyrene resin, an acrylonitrile-styrene resin (AS resin), and an acrylonitrile-butadiene-styrene resin (ABS resin). Examples of the polyamide resin include a polyamide 6 resin (nylon 6), a polyamide 11 resin (nylon 11), a polyamide 12 resin (nylon 12), a polyamide 46 resin (nylon 46), a polyamide 66 resin (nylon 66), and a polyamide 610 resin (nylon 610). Examples of the polyester resin include a polyethylene terephthalate resin, a polyethylene naphthalate resin, a polybutylene terephtalate resin, a polytrimethylene terephtalate resin, and liquid crystal polyester. Examples of the (meth) acrylic resin include polymethyl methacrylate. Examples of the polyphenylene ether resin include modified polyphenylene ether. Examples of the polyimide resin include thermoplastic polyimide, a polyamide imide resin, a polyetherimide resin. Examples of the polysulfone resin include a modified polysulfone resin, and a polyether sulfone resin. Examples of the polyether ketone resin include a polyether ketone resin, a polyether ether ketone resin, and a polyether ketone ketone resin. Examples of the fluororesin include polytetrafluoroethylene.

As the thermoplastic resin used in the present invention, one kind may be used alone, or two or more kinds may be used in combination. Examples of the configuration where two or more kinds of thermoplastic resins are used in combination include a configuration where thermoplastic resins having different softening points or melting points are used in combination, and a configuration where thermoplastic resins having different average molecular weights are used in combination. However, the present invention is not limited to these examples.

[Other Examples]

Within a range where the object of the present invention can be achieved, the carbon-fiber-reinforced resin composite material may include a fibrous or non-fibrous filler such as glass fibers or organic fibers, or an additive such as a flame retardant, an anti-UV agent, a pigment, a release agent, a softener, a plasticizer, or a surfactant.

[Carbon-fiber-reinforced Resin Composite Material]

It is preferable that the carbon-fiber-reinforced resin composite material according to the present invention is obtained by impregnating the carbon fiber mat with the thermoplastic resin in the random mat under pressure and heating. The impregnation step may be performed in a batch process or a continuous process and is preferably performed in a continuous process from the viewpoint of productivity.

(Total Areal Weight of Carbon Fibers and Thermoplastic Resin)

The sum of the areal weight of the carbon fibers and the areal weight of the thermoplastic resin in the carbon-fiber-reinforced resin composite material according to the present invention (hereinafter, simply referred to as "total areal weight") is not particularly limited, and is preferably 50 to 20000 g/m$^2$, more preferably 500 to 15000 g/m$^2$, and still more preferably 1000 to 10000 g/m$^2$. In a case where the total areal weight is 50 g/m$^2$ or higher, it is easy to control the sprayed state of the carbon fibers. As a result, the coefficient of variation (CV1) of the total areal weight and the coefficient of variation (CV2) of the carbon fiber volume fraction (Vf) can be reduced. On the other hand, in a case where the total areal weight is 20000 g/m$^2$ or lower, the thickness of a shaped product obtained by press-molding or the like is not excessively large, and a desired light-weight shaped product is likely to be obtained.

(Carbon Fiber Volume Fraction)

In the present invention, the carbon fiber volume fraction (Vf) in the carbon-fiber-reinforced resin composite material which is defined by the following Expression (a) is not particularly limited. The carbon fiber volume fraction (Vf) in the carbon-fiber-reinforced resin composite material is preferably 10 to 60 vol %, more preferably 20 to 50 vol %, and still more preferably 25 to 45 vol %.

Carbon Fiber Volume Fraction ($Vf$)=100×Volume of Carbon Fibers/(Volume of Carbon Fibers+Volume of Thermoplastic Resin)   Expression (a)

In a case where the carbon fiber volume fraction (Vf) in the carbon-fiber-reinforced resin composite material is 10 vol % or higher, desired mechanical properties are likely to be obtained. On the other hand, in a case where the carbon fiber volume fraction (Vf) in the carbon-fiber-reinforced resin composite material is 60 vol % or lower, the fluidity is excellent when the carbon-fiber-reinforced resin composite material is used for press-molding or the like, and a desired shaped product shape is likely to be obtained.

(Coefficient of variation (CV1 in Total Areal Weight)

The coefficient of variation (CV1) of the total areal weight of the carbon-fiber-reinforced resin composite material according to the present invention is 10% or lower.

The coefficient of variation (CV1) of the total areal weight in the present invention is obtained by calculating a coefficient of variation in the respective total areal weights based on Expression (g) when the entire in-plane area of the carbon-fiber-reinforced resin composite material is divided into points at a pitch of 25 mm×25 mm. For example, in a case where the carbon-fiber-reinforced resin composite material has a planar shape having a size of 100 mm×100 mm, the coefficient of variation (CV1) of the total areal weight is defined as a coefficient of variation measured when the entire in-plane area is divided into 16 regions of 4×4.

Coefficient of variation (CV1) of Total Areal Weight=100×Standard Deviation of Total Areal Weights/Average Value of Total Areal Weights   Expression (g)

By adjusting the coefficient of variation (CV1) of the total areal weight to be 10% or lower, the unevenness in shape and mechanical properties can be reduced at a small pitch, and excellent moldability and mechanical properties can be exhibited even in a small shaped product or a shaped product having a complex shape. In particular, in a case where a shaped product is obtained by cold-pressing the carbon-fiber-reinforced resin composite material according to the present invention, the carbon-fiber-reinforced resin composite material uniformly flows, and thus excellent moldability is exhibited.

The coefficient of variation (CV1) of the total areal weight is preferably 7% or lower and more preferably 5% or lower. A method of controlling the coefficient of variation (CV1) will be described below.

(Coefficient of variation (CV2) of Carbon Fiber Volume Fraction (Vf))

In the present invention, the coefficient of variation (CV2) of the carbon fiber volume fraction (Vf) of the carbon-fiber-reinforced resin composite material is 15% or lower.

The coefficient of variation (CV2) of the carbon fiber volume fraction (Vf) described herein is obtained by calculating a coefficient of variation in the respective carbon fiber volume fractions (Vf) based on Expression (h) when the entire in-plane area of the carbon-fiber-reinforced resin composite material is divided into points at a pitch of 25 mm×25 mm. For example, in a case where the carbon-fiber-reinforced resin composite material has a planar shape having a size of 100 mm×100 mm, the coefficient of variation (CV2) of the carbon fiber volume fraction (Vf) is defined as a coefficient of variation measured when the entire in-plane area is divided into 16 regions of 4×4.

Coefficient of variation (CV2) of Carbon Fiber Volume Fraction ($Vf$)=100×Standard Deviation of Carbon Fiber Volume Fractions/Average Value of Carbon Fiber Volume Fractions   Expression (h)

By adjusting the coefficient of variation (CV2) of the carbon fiber volume fraction (Vf) to be 15% or lower, the unevenness in shape and mechanical properties during molding can be reduced at a small pitch, and excellent moldability and mechanical properties can be exhibited even in a small shaped product or a shaped product having a complex shape. In particular, in a case where a shaped product is obtained by cold-pressing the carbon-fiber-reinforced resin composite material according to the present invention, the carbon-fiber-reinforced resin composite material uniformly flows, and thus excellent moldability is exhibited.

The coefficient of variation (CV2) of the carbon fiber volume fraction (Vf) is preferably 12% or lower and more preferably 10% or lower. A method of controlling the coefficient of variation (CV2) will be described below.

(Coefficient of variation (CV3) in Volume Fraction of Carbon Fiber Reinforced Resin Composite Material)

In the carbon fibers included in the carbon-fiber-reinforced resin composite material according to the present invention, a coefficient of variation (CV3) of a volume fraction of the carbon fiber bundle (A) comprising a critical number of single fibers defined by Expression (b) or more is preferably 10% or less.

The coefficient of variation (CV3) of the volume fraction of the carbon fiber bundle (A) described herein is obtained by calculating a coefficient of variation of the respective volume fractions of the carbon fiber bundles (A) based on the following Expression (i) when an arbitrary in-plane area of the carbon-fiber-reinforced resin composite material is divided into points at a pitch of 25 mm×25 mm and 10 points are arbitrarily extracted from all the points. For example, in a case where the carbon-fiber-reinforced resin composite material has a planar shape having a size of 100 mm×100 mm, the coefficient of variation (CV3) of the volume fraction of the carbon fiber bundle (A) is defined as a coefficient of variation measured when the entire in-plane area is divided into 16 regions of 4×4 and 10 points are arbitrarily extracted from all the points.

$$\text{Coefficient of variation (CV3) of Volume Fraction of Carbon Fiber Bundle (A)} = 100 \times \text{Standard Deviation of Volume Fractions of Carbon Fiber Bundles (A)/Average Value of Volume Fractions of Carbon Fiber Bundles (A)} \quad \text{Expression (i)}$$

By adjusting the coefficient of variation (CV3) of the volume fraction of the carbon fiber bundle (A) to be 10% or lower, impregnation unevenness in the impregnation step can be suppressed, the unevenness in shape and mechanical properties during molding can be reduced at a small pitch, and excellent moldability and mechanical properties can be exhibited even in a small shaped product or a shaped product having a complex shape. In particular, in a case where a shaped product is obtained by cold-pressing the carbon-fiber-reinforced resin composite material according to the present invention, the carbon-fiber-reinforced resin composite material uniformly flows, and thus excellent moldability is exhibited.

The coefficient of variation (CV3) of the volume fraction of the carbon fiber bundle (A) is preferably 7% or lower and more preferably 5% or lower. A method of controlling the coefficient of variation (CV3) of the volume fraction of the carbon fiber bundle (A) will be described below.

$$\text{Critical Number of Single Fibers} = 600/D \quad \text{Expression (b)}$$

(wherein D represents the average fiber diameter (μm) of the carbon fibers).

The carbon-fiber-reinforced resin composite material according to the present invention is preferably formed of a single layer from the viewpoint of productivity, and the thickness thereof is preferably 0.3 mm or more, more preferably 0.5 mm or more, still preferably 1.0 mm or more, still preferably 1.5 mm or more, still preferably 2.0 mm or more, and still preferably 2.5 mm or more. Even in a case where the carbon-fiber-reinforced resin composite material according to the present invention is formed of a relatively thick single layer having a thickness of 0.3 mm or more, the coefficient of variation (CV1) of the total areal weight and the coefficient of variation (CV2) of the carbon fiber volume fraction (Vf) can be reduced.

The above-described single layer refers to a layer of the carbon-fiber-reinforced resin composite material which is formed by depositing the reinforcing fibers and the resin to obtain a precursor of the carbon-fiber-reinforced resin composite material and performing a impregnation treatment on the precursor of the carbon-fiber-reinforced resin composite material without stacking it.

In this case, a shaped product having a desired thickness and a desired shape may be obtained by forming a single layer of the carbon-fiber-reinforced resin composite material and stacking this single layer multiple times.

The size (length×width) of the carbon-fiber-reinforced resin composite material according to the present invention is preferably 100 mm×100 mm or more and more preferably 200 mm×200 mm or more. In addition, the surface area of the carbon-fiber-reinforced resin composite material is preferably 10000 mm$^2$ or more and more preferably 40000 mm$^2$ or more.

In addition, the size (width direction, TD direction) of the carbon-fiber-reinforced resin composite material according to the present invention is preferably 500 mm or more, more preferably 1000 mm or more, and still more preferably 1400 mm or more.

[Method of Manufacturing Carbon-fiber-reinforced Resin Composite Material]

The carbon-fiber-reinforced resin composite material used in the present invention can be preferably manufactured using an airlaid method except for means for controlling various coefficient of variations. The details of steps of manufacturing the carbon-fiber-reinforced resin composite material can be found in, for example, JP-A-2011-178891 or JP-A-2013-49208, and these steps include the following steps 1 to 4.

1. A step of feeding carbon fibers from a creel portion, widening the fed carbon fibers using a widening device, and separating the widened carbon fibers through a longitudinal slit device to form a carbon fiber bundle.

2. A cutting-opening step of cutting the carbon fiber bundle, introducing the cut carbon fiber bundle pieces (hereinafter, referred to as "fiber bundle pieces") into tube bodies, and blowing air into the fiber bundle pieces to open them separately to some extent.

3. a spraying-fixing step of spraying the fiber bundle pieces, which have undergone the opening step, and concurrently spraying a thermoplastic resin in the form of a fiber or a powder, which is supplied from a resin supply portion, on a breathable support while suctioning them using a suction device to obtain a random mat.

4. An impregnation step of impregnating the carbon fiber bundle, which is sprayed in the random mat, with the thermoplastic resin under pressure and heating.

In the above-described "2." according to the present invention, it is preferable that the cut carbon fiber pieces are transported a short distance into the tube bodies in a vertical downward direction.

By transporting the cut carbon fiber pieces a short distance in the vertical downward direction, various coefficient of variations CV1 and CV2 (further CV3) can be more suitably adjusted to the values according to the present invention as compared to a case where the cut carbon fiber pieces are transported using a long transport tube, or in a curved manner using a flexible tube or the like.

[Airlaid Method]

In a general airlaid method, a predetermined amount opened and separated reinforcing fibers and optionally the thermoplastic resin are transported while dispersing in an air flow, the reinforcing fibers and the like blown from a discharge port are caused to fall on the breathable support (fiber collecting net) provided in a low portion, the reinforcing fibers are deposited on the breathable support as a web while suctioning the air from below the breathable support, and this operation is optionally repeated multiple times. As a result, a carbon fiber mat or a random mat is manufactured.

[Method of Controlling Various Coefficients of Variation]

A method of controlling various coefficients of variation CV1, CV2, and CV3 of the carbon-fiber-reinforced resin composite material is not particularly limited. For example, by adopting the following manufacturing method in the above-described "3. spraying-fixing step of obtaining a random mat", a coefficient of variation (CV1') of the total areal weight of the random mat (the precursor of the carbon-fiber-reinforced resin composite material) obtained in the spraying-fixing step, a coefficient of variation (CV2') of the carbon fiber volume fraction (Vf) thereof, and a coefficient of variation (CV3') of the volume fraction of the carbon fiber bundle (A) thereof may be controlled, and an impregnation treatment may be performed on the obtained random mat under pressure and heating. An impregnation method is not particularly limited, and a continuous process is preferable from the viewpoint of productivity. In addition, it is preferable that the impregnation temperature is equal to or higher than a softening point of the thermoplastic resin and, in the case of a crystalline resin, is equal to or higher than a melting point and that the impregnation pressure is controlled in a range where the coefficient of variation (CV1') of the total fiber areal weight of the random mat obtained in the spraying-fixing step, the coefficient of variation (CV2') of the carbon fiber volume fraction (Vf) thereof, and the coefficient of variation (CV3') of the volume fraction of the carbon fiber bundle (A) thereof do not largely vary. Typically, in the process of performing an impregnation treatment on the random mat to obtain the carbon-fiber-reinforced resin composite material, the coefficient of variation (CV1') of the total areal weight decreases, the coefficient of variation (CV2') of the carbon fiber volume fraction (Vf) increases, and a change in the coefficient of variation (CV3') of the volume fraction of the carbon fiber bundle (A) tends to small. This is because, in the impregnation step, the carbon fibers are not likely to flow under pressure but the thermoplastic resin largely flows under pressure. In a case where the impregnation pressure is excessively high, various coefficient of variations largely change. However, in a case where it is desired that the impregnation pressure is increased for the improvement of impregnating ability and the like, it is preferable that a holding mechanism is provided in an impregnating device in order to prevent unnecessary flows of the carbon fibers and the thermoplastic resin in the random mat.

MANUFACTURING EXAMPLE 1

In a method of manufacturing the carbon-fiber-reinforced resin composite material according to the present invention, it is preferable for improving productivity that a manufacturing device is preferably used which includes a plurality of tube bodies described above and continuously sprays the carbon fibers and the thermoplastic resin on the breathable support through the tube bodies while transporting the breathable support in one direction. However, in a case where the carbon fibers and the thermoplastic resin are simultaneously sprayed on the breathable support through the plurality of tube bodies, typically, spraying unevenness of the carbon fibers and the thermoplastic resin is generated between the plurality of tube bodies due to unevenness in the air flow. As a result, the coefficient of variation (CV1') of the total areal weight of the random mat as the precursor of the carbon-fiber-reinforced resin composite material, the coefficient of variation (CV2') of the carbon fiber volume fraction (Vf) thereof, and the coefficient of variation (CV3') of the volume fraction of the carbon fiber bundle (A) thereof increase. As a method of reducing these coefficient of variations, a tube body unit (refer to FIGS. 1A and 1B) can be preferably used in which tube bodies are disposed in the width direction at a predetermined specific distance between the tube bodies with a phase difference in the longitudinal direction. In the tube body unit in which a plurality of tube body rows, each of which includes a plurality of tube bodies periodically disposed in a direction perpendicular to a width direction (TD direction, transverse Direction), are provided in the width direction, the phase difference described herein refers to a deviation (for example, P1 in FIG. 1A) in a direction parallel to the rows (the direction perpendicular to the width direction) between the center of one specific tube body in a given row and the center of a tube body which is included in a row adjacent to the given row and is most adjacent to the specific tube body. It is preferable that the distance (X1) between the centers of the tube bodies adjacent to each other is determined such that the carbon fibers and the thermoplastic resin, which are sprayed through the tube bodies adjacent to each other, are not mixed with each other in air before fixed on the breathable support. In addition, the disposition of the tube bodies for providing the phase difference (for example, P1 in FIG. 1A) is not particularly limited. It is more preferable that the phase difference (for example, P1 in FIG. 1A) between the tube bodies in the width direction (TD direction, transverse direction) is narrower than half of an average spray width (for example, W1 in FIG. 1A) of the obtained random mat. The average spray width (for example, W1 in FIG. 1A) of the random mat is an average value of the widths of the random mats which are sprayed through the respective tube bodies. The distances (for example, X1 in FIG. 1A) between the centers of the tube bodies adjacent to each other, the phase differences (for example, P1 in FIG. 1A), and the spray width (for example, W1 in FIG. 1A) of the random mat may be the same as or different from each other in the tube body unit as long as they are in the above-described preferable ranges. By providing the phase difference as described above, the respective random mats prepared by the plurality of tube bodies overlap each other on the breathable support, the values of the coefficient of variation (CV1') of the total areal weight can be controlled to be 10% or lower, and the values of the coefficient of variation (CV2') of the carbon fiber volume fraction (Vf) can be controlled to be 15% or lower (in addition, preferably, the values of the coefficient of variation (CV3') of the volume fraction of the carbon fiber bundle (A) can be controlled to be 10% or lower).

MANUFACTURING EXAMPLE 2

In addition, for example, a manufacturing method can also be preferably used in which, in the step of spraying and fixing the carbon fibers and the thermoplastic resin on the breathable support using the tube body unit, which includes a plurality of tube bodies, and continuously transporting the obtained random mat in one direction as described in Manufacturing Example 1, the tube body unit is swung in a circular shape, an elliptical shape, a wavy shape, or the like in an arbitrary direction, for example, a direction (TD direction, transverse direction) perpendicular to the transport direction (MD direction, machine direction). Swinging conditions are not particularly limited, and it is preferable that a ratio V2/V1 of a swinging rate (V2) to a transport rate (V1) of the breathable support is 3 to 60.

Here, the swinging rate (V2) refers to the distance of one cycle of swinging per unit time. By setting V2/V1 to be 3 to 60, the unevenness in the total areal weight, the carbon fiber volume fraction (Vf), and preferably the volume fraction of the carbon fiber bundle (A) in the transport direction can be reduced while maintaining the process stability. In addition, it is preferable that a swinging amplitude (W2) is more than half of the distance (X1) between the centers of the tube bodies adjacent to each other. Here, the swinging amplitude (W2) is half of a maximum value of the distance between intersections when the intersections are obtained from the breathable support and a center line of one tube body in a tube body passing direction during swinging. As a result, the respective random mats prepared by the plurality of tube bodies overlap each other on the breathable support, the values of the coefficient of variation (CV1') of the total areal weight can be controlled to be 10% or lower, and the values of the coefficient of variation (CV2') of the carbon fiber volume fraction (Vf) can be controlled to be 15% or lower (in addition, preferably, the values of the coefficient of variation (CV3') of the volume fraction of the carbon fiber bundle (A) can be controlled to be 10% or lower).

MANUFACTURING EXAMPLE 3

In addition, a manufacturing method can also be preferably used in which, for example, in the step of spraying and fixing the carbon fibers and the thermoplastic resin on the breathable support using the tube body unit, which includes a plurality of tube bodies, and continuously transporting the obtained random mat in one direction, the random mat sprayed and fixed on the breathable support is mechanically leveled. A method of the mechanical leveling is not particularly limited, and a method of vertically reciprocating or rotating a leveling device which includes a plurality of leveling mechanisms having, for example, a needle shape or a hoe shape relative to the random mat is preferable. As a result, the unevenness in the total areal weight of the random mat, and the unevenness in the carbon fiber volume fraction (Vf) in the random mat (preferably the unevenness in the volume fraction of the carbon fiber bundle (A)) can be reduced, and the values of the coefficient of variation (CV1') of the total areal weight can be controlled to be 10% or lower, and the values of the coefficient of variation (CV2') of the carbon fiber volume fraction (Vf) can be controlled to be 15% or lower (in addition, preferably, the values of the coefficient of variation (CV3') of the volume fraction of the carbon fiber bundle (A) can be controlled to be 10% or lower).

[Method of Molding Carbon-fiber-reinforced Resin Composite Material]

In a case where the carbon-fiber-reinforced resin composite material is molded, various molding methods can be used, and it is preferable that the molding is performed under heating and pressure. As the molding method, a compression molding method such as so-called cold pressing or hot pressing can be preferably used.

(Cold Pressing)

In the cold pressing, for example, the carbon-fiber-reinforced resin composite material heated to a first predetermined temperature is put into a mold set to a second predetermined temperature, and then is pressed and cooled. Specifically, in a case where the thermoplastic resin included in the carbon-fiber-reinforced resin composite material is crystalline, the first predetermined temperature is equal to higher than a melting point of the thermoplastic resin, and the second setting temperature is lower than the melting point. In a case where the thermoplastic resin is amorphous, the first predetermined temperature is equal to or higher than a glass transition temperature of the thermoplastic resin, and the second setting temperature is lower than the glass transition temperature.

That is, the cold pressing includes at least the following steps A-1) and A-2).

A-1) A step of heating the carbon-fiber-reinforced resin composite material to, in a case where the thermoplastic resin is crystalline, a temperature which is a melting point or higher and a decomposition temperature or lower, or in a case where the thermoplastic resin is amorphous, a temperature which is a glass transition temperature or higher and a decomposition temperature or lower.

A-2) A step of disposing and pressing the carbon-fiber-reinforced resin composite material heated in A-1) described above to a mold whose temperature is adjusted to, in a case where the thermoplastic resin is crystalline, a temperature which is lower than the melting point, or in a case where the thermoplastic resin is amorphous, a temperature which is lower than the glass transition temperature.

Through the above-described steps, the molding of the carbon-fiber-reinforced resin composite material can be completed.

When put into the mold, the carbon-fiber-reinforced resin composite material is used in the form of a single sheet or a plurality of sheets depending on the thickness of a target shaped product. In a case where a plurality of sheets of the carbon-fiber-reinforced resin composite material are used, the sheets of the carbon-fiber-reinforced resin composite material may be laminated in advance and then heated, the sheets of the heated carbon-fiber-reinforced resin composite material may be laminated and then put into the mold, or the sheets of the heated carbon-fiber-reinforced resin composite material may be sequentially laminated in the mold. In a case where the sheets of the carbon-fiber-reinforced resin composite material are laminated, it is preferable that a temperature difference between the carbon-fiber-reinforced resin composite material on the lowermost layer and the carbon-fiber-reinforced resin composite material on the uppermost layer is as little as possible. From this point of view, it is preferable that the sheets of the carbon-fiber-reinforced resin composite material are laminated before putting into the mold. In addition, for the pressing in A-1) described above, for example, a mold or a nip roller can be used. It is necessary that the above-described steps are performed in the above-described order, but another step may be provided between the respective steps. As the other step, for example, a shaping step of shaping the carbon-fiber-reinforced resin composite material into a shape of a cavity of the mold in advance using another shaping mold, which is different from the mold used in A-2), may be provided before A-2).

(Hot Pressing)

In the hot pressing, for example, the carbon-fiber-reinforced resin composite material is put into a mold and pressed while increasing the temperature of the mold to a first predetermined temperature, and then the mold is cooled to a second predetermined temperature. Specifically, in a case where the thermoplastic resin included in the carbon-fiber-reinforced resin composite material is crystalline, the first predetermined temperature is equal to higher than a melting point of the thermoplastic resin, and the second predetermined temperature is lower than the melting point. In a case where the thermoplastic resin included in the carbon-fiber-reinforced resin composite material is amorphous, the first predetermined temperature is equal to or higher than a glass transition temperature of the thermoplastic resin, and the second predetermined temperature is lower than the glass transition temperature.

It is preferable that the hot pressing includes at least the following steps B-1) to B-4).

B-1) A step of disposing the carbon-fiber-reinforced resin composite material into a mold.

B-2) A step (first pressing step) of pressing the carbon-fiber-reinforced resin composite material while heating the mold to, in a case where the thermoplastic resin is crystalline, a temperature which is a melting point of the thermoplastic resin or higher and a thermal decomposition temperature thereof or lower, or in a case where the thermoplastic resin is amorphous, a temperature which is a glass transition temperature of the thermoplastic resin or higher and a thermal decomposition temperature thereof or lower.

B-3) A step (second pressing step) of pressing the carbon-fiber-reinforced resin composite material in multiple stages such that a pressure in the final stage is 1.2 times to 100 times with respect to a pressure of the first pressing step.

B-4) A step of adjusting the temperature of the mold to, in a case where the thermoplastic resin is crystalline, a temperature which is lower than the melting point, or in a case where the thermoplastic resin is amorphous, to a temperature which is lower than the glass transition temperature.

Through the above-described steps, the molding of the carbon-fiber-reinforced resin composite material can be completed.

(Common Features)

In the steps A-2) and B-3), a shaped product having a desired shape is obtained by applying a pressure to the carbon-fiber-reinforced resin composite material. At this time, the molding pressure is not particularly limited and is preferably as low as possible in a range where the desired shaped product shape can be obtained. Specifically, the molding pressure is lower than 30 MPa, more preferably 20 MPa or lower, and still more preferably 10 MPa or lower with respect to the projected area of the mold cavity.

It is preferable that the molding pressure is lower than 30 MPa because the plant investment or the maintenance cost of a press machine is not necessary. In the above-described carbon-fiber-reinforced resin composite material, the fluidity during molding is high, and the coefficient of variation CV1 of the total areal weight and the coefficient of variation CV2 of the carbon fiber volume fraction (Vf) are small (in addition, preferably, the coefficient of variation CV3 of the volume fraction of the carbon fiber bundle (A) is also small). Therefore, even in a case where the molding pressure is low, a small shaped product or a shaped product having a complex shape can be stably obtained.

In addition, of course, various steps may be provided between the above-described steps during compression molding. For example, vacuum compression molding of molding the carbon-fiber-reinforced resin composite material in a vacuum may be used.

(Improvement of Welding Stability of Shaped Product)

In a case where sheets of the composite materials including the carbon fibers and the thermoplastic resin are joined to each other, vibration welding, IR welding, ultrasonic welding, thermal welding, or the like is used in many cases instead of an adhesive.

In many cases, the welding strength is generally determined depending on a state where the carbon fibers and the thermoplastic resin are present in a welding portion. In a case where the amount of the carbon fibers is extremely large in the welding portion, or in a case where the unevenness in thickness is large on a weld surface, poor welding may occur. It is desired that the unevenness in the total areal weight of the welding portion and the unevenness in the carbon fiber volume fraction (Vf) of the welding portion are controlled.

In a shaped product which is obtained using the carbon-fiber-reinforced resin composite material according to the present invention, the coefficient of variation (CV1) of the total areal weight of the carbon fibers and the thermoplastic resin, and the coefficient of variation (CV2) of the carbon fiber volume fraction (Vf) are extremely low (in addition, preferably, the coefficient of variation CV3 of the volume fraction of the carbon fiber bundle (A) is also small). Therefore, there is an advantageous effect in that the welding strength is easily stabilized.

EXAMPLES

Hereinafter, the present invention will be described in detail using Examples. However, the present invention is not limited to these Examples.

Values in Examples were obtained using the following methods.

1. Analysis of Carbon-fiber-reinforced Resin Composite Material (1) Analysis of Total Areal Weight The entire area of the carbon-fiber-reinforced resin composite material was cut into samples at a pitch of about 25 mm×25 mm, and the aerial weights of all the cut samples were measured using an electronic balance. Regarding the dimension of each of the samples, the distances (W2 and W3) between two sides were precisely measured in units of $\frac{1}{1000}$ mm using a micrometer. The total areal weights of the respective samples were calculated from Expression (j). Further, an average value and a standard deviation of the total areal weights were calculated using the number of all the samples (in this example, 400 of 40 (width direction)×10 (length direction) obtained from an isotropic base material having a width of 1000 mm and a length of 250 mm), and the coefficient of variation (CV1) of the total areal weight was obtained from Expression (g).

Total Areal Weight=Aerial Weight/($W2 \times W3$)  Expression (j)

Coefficient of variation (CV1) of Total Areal Weight=100×Standard Deviation of Total Areal Weights/Average Value of Total Areal Weights  Expression (g)

(2) Analysis of Carbon Fiber Volume Fraction (Vf)

The entire area of the carbon-fiber-reinforced resin composite material was cut into samples at a pitch of about 25 mm×25 mm, the aerial weights of all the cut samples were measured using an electronic balance. Next, each of the samples was burned in air at 500° C. for 1 hour to remove the thermoplastic resin therefrom, and the weight of the burned sample was weighed. As a result, the weights of the carbon fibers and the thermoplastic resin were calculated. Next, the volume fractions of the carbon fibers and the thermoplastic resin were calculated using specific gravity values of the respective components. The carbon fiber volume fraction (Vf) in each of the samples was calculated from Expression (a).

$Vf$=100×Volume of Carbon Fibers/(Volume of Carbon Fibers+Volume of Thermoplastic Resin)  Expression (a).

Further, an average value and a standard deviation of the carbon fiber volume fractions were calculated using the number of all the samples (400), and the coefficient of variation (CV2) of the carbon fiber volume fraction (Vf) was obtained from Expression (h).

Coefficient of variation (CV2) of Carbon Fiber Volume Fraction ($Vf$)=100×Standard Deviation of Carbon Volume Fractions/Average Value of Carbon Fiber Volume Fractions  Expression (h)

(3) Analysis of Fiber Bundle 10 points were arbitrarily extracted from the carbon-fiber-reinforced resin composite material at a pitch of 25 mm×25 mm, and samples were cut at the 10 points. These samples were put into a furnace at 500° C. for about 1 hour to remove the resin therefrom, and all the remaining fiber bundles were pulled out using tweezers. The number (I) of the carbon fiber bundles (A) and the weights (Wi) thereof were measured. Regarding excessively small fiber bundles which were not able to be pulled out using the tweezers, the total weight thereof was measured in the end (Wk). In order to measure the weight, a balance capable of measuring up to $\frac{1}{100}$ mg was used. The critical number of single fibers was calculated using the fiber diameter (D) of the carbon fibers used in the carbon-fiber-reinforced resin composite material, and the carbon fibers were divided into the carbon fiber bundles (A) including a critical number of single fibers or more and carbon fibers other than the carbon fiber bundle (A).

The volume fraction (VR) of the carbon fiber bundle (A) with respect to the total amount of the fibers in the carbon-fiber-reinforced resin composite material was obtained from Expression (k) using the density ($\rho$) of the carbon fibers.

$VR = \Sigma(Wi/\rho) \times 100/((Wk + \Sigma Wi)/\rho)$  Expression (k)

Further, an average value and a standard deviation of the volume fractions in the 10 samples were calculated, and the coefficient of variation (CV3) of the volume fraction (Vf) of the carbon fiber bundle (A) was obtained from Expression (i).

Coefficient of variation (CV3) of Volume Fraction of Carbon Fiber Bundle (A)=100×Standard Deviation of Volume Fractions of Carbon Fiber Bundles (A)/Average Value of Volume Fractions of Carbon Fiber Bundles (A)   Expression (i)

(4) Analysis of Average Fiber Length of Carbon Fibers

The average fiber length of the carbon fibers included in the carbon-fiber-reinforced resin composite material was obtained as follows. The carbon-fiber-reinforced resin composite material was put into a furnace at 500° C. for about 1 hour to remove the thermoplastic resin therefrom. Next, the lengths of 100 arbitrarily extracted carbon fibers were measured and recorded in units of 1 mm using a caliper and a magnifying glass. Based on all the measured lengths of the carbon fibers (Li, wherein i represents an integer of 1 to 100), the weight average fiber length (Lw) was obtained from the following expression.

$$Lw=(\Sigma Li^2)/(\Sigma Li)$$   Expression (f)

(5) Tensile Strength 15 specimens were cut from the carbon-fiber-reinforced resin composite material in the width direction using a water jet, and a tensile test was performed using a universal tester 5982R4407 (manufactured by Illinois Tool Works Inc.) with reference to JIS K-7164:2005. The shape of each of the specimens was an A-type specimen. The distance between chucks was 115 mm, and the test rate was 2 mm/min.

Further, an average value and a standard deviation of the tensile strengths were calculated using the number of all the samples (15), and a coefficient of variation (CV4) of the tensile strength was obtained from Expression (I).

Coefficient of variation (CV4) of Tensile Strength=100×Standard Deviation of Tensile Strengths/Average Value of Tensile Strengths   Expression (I)

(6) Flow Length during Molding

A sample having a size of 250 mm×250 mm was cut from the carbon-fiber-reinforced resin composite material. Using a resin sheet heating device (manufactured by NGK kiln Tec; Model No.: H7GS-73408), this sample was heated to 290° C. which was equal to or higher than a plasticizing temperature of polyamide 6 (thermoplastic resin) (in the case of polycarbonate (thermoplastic resin), was heated to 300° C.).

The sample was disposed on a lower die of a mold set to 150° C. and having a clearance of 400 mm×400 mm×2.6 mm, an upper die of the mold was lowered to cold-press the sample at 20 MPa for 1 minute. As a result, a flat press-molded product was prepared. The upper die of the mold was raised to completely open the mold. Next, the press-molded product was extracted from the lower die.

Figure 2:
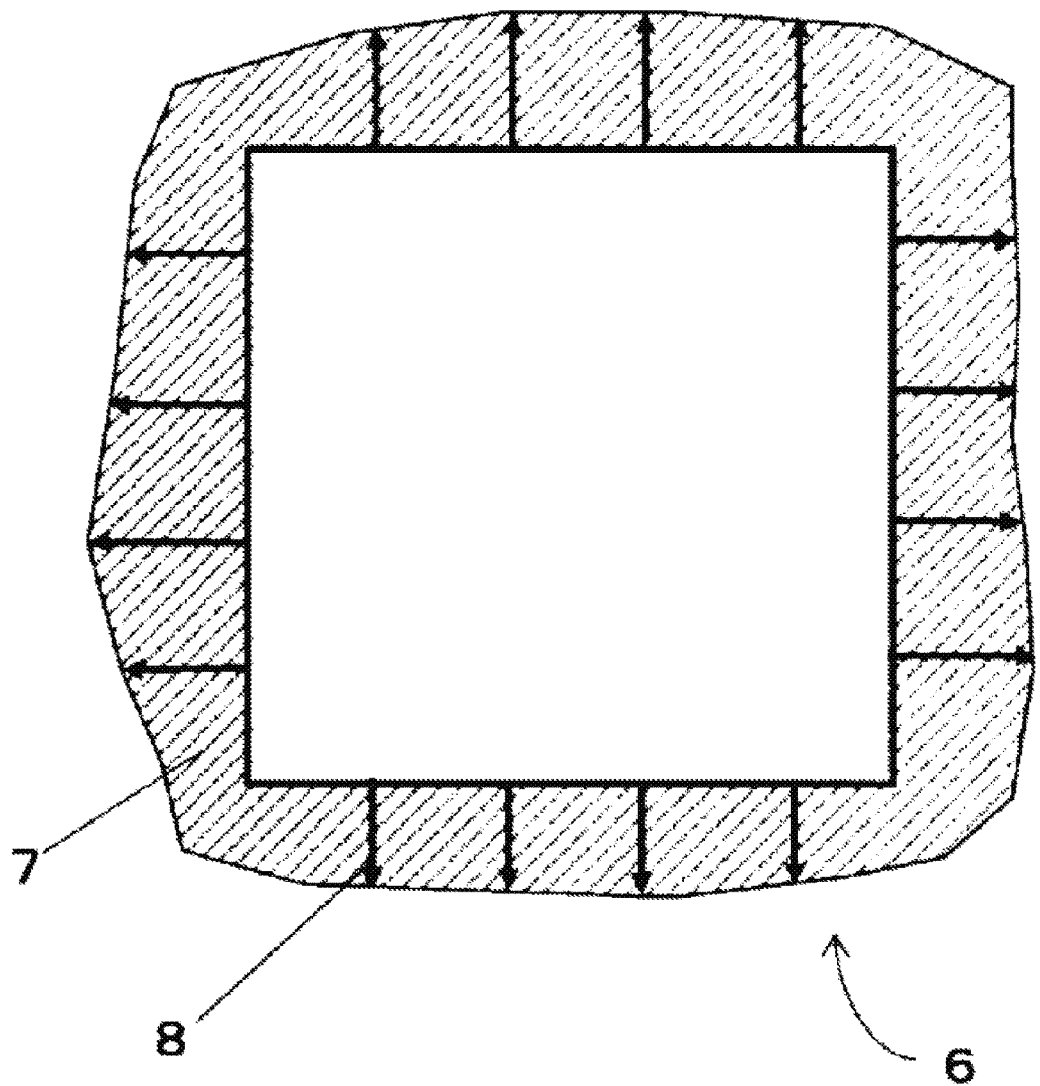
FIG. 2 is a schematic diagram showing flow lengths during molding.

By comparing the extracted press-molded product to the sample having a size of 250 mm×250 mm which was cut from the carbon-fiber-reinforced resin composite material before press-molding, the flow distance during the cold pressing was measured. Specifically, four sides shown in the schematical diagram of FIG. 2 were caused to flow, and the flow length of each side was measured at four points.

Further, an average value and a standard deviation of the flow lengths measured at the respective sides (16 points of 4 sides×4 points) were calculated, and a coefficient of variation (CV5) of the flow length during molding was obtained from Expression (m).

Coefficient of variation (CV5) of Flow Length=100× Standard Deviation of Flow Lengths/Average Value of Flow Lengths   Expression (m)

(7) Evaluation of External Appearance of Shaped Product

A sample having a size of 390 mm×390 mm was cut from the carbon-fiber-reinforced resin composite material. Using a resin sheet heating device (manufactured by NGK kiln Tec; Model No.: H7GS-73408), this sample was heated to 290° C. which was equal to or higher than a plasticizing temperature of polyamide 6 (thermoplastic resin) (in the case of polycarbonate (thermoplastic resin), was heated to 300° C.).

The heated sample of the carbon-fiber-reinforced resin composite material was disposed on a lower die of a mold set to 150° C. and having a clearance of 400 mm×400 mm×2.6 mm, an upper die of the mold was lowered to cold-press the sample at 20 MPa for 1 minute. As a result, a flat press-molded product was prepared. The upper die of the mold was raised to completely open the mold. Next, the press-molded product was extracted from the lower die.

The number of surface convex portions (having a minimum length of 1 mm or more) formed on both surfaces of the extracted press-molded product due to air trapping were measured.

2. Analysis of Random Mat (1) Analysis of Total Areal Weight

The total areal weight of the random mat and the coefficient of variation (CV1') of the total areal weight were measured using the same method as described above in "1. (1) Analysis of Total areal weight", except that the cut target was changed to the random mat.

(2) Analysis of Carbon Fiber Volume Fraction (Vf)

The carbon fiber volume fraction (Vf) of the random mat and the coefficient of variation (CV2') of the carbon fiber volume fraction were measured using the same method as described above in "1. (2) Analysis of Carbon Fiber Volume Fraction (Vf)", except that the cut target was changed to the random mat.

(3) Analysis of Fiber Bundle (A)

The carbon fiber bundle (A) of the random mat was analyzed and the coefficient of variation (CV3') of the volume fraction of the carbon fiber bundle (A) were measured using the same method as described above in "1. (3) Analysis of Fiber Bundle", except that the cut target was changed to the random mat.

(4) Analysis of Average Fiber Length of Carbon Fibers

The average fiber length of the random mat was analyzed using the same method as described above in "1. (4) Analysis of Average Fiber Length of Carbon Fibers", except that the cut target was changed to the random mat.

Example 1

As the carbon fibers, carbon fibers "TENAX (registered trade name) STS40-24K (manufactured by Toho Tenax Co., Ltd.; average fiber diameter: 7 μm, fiber width: 10 mm) were widened to a fiber width of 20 mm and were further separated at an interval of ⅕. Using a rotary cutter as a cutter, the carbon fibers were cut in a fixed fiber length of 20 mm. Next, the cut carbon fibers were supplied to tube bodies, which were provided immediately below the cutter, at a supply rate of 115 g/min, and were opened by blowing compressed air thereto from pores in the tube bodies. Concurrently, nylon 6 resin A1030 (PA6; manufactured by Unitika Ltd.) as a matrix resin was supplied from a resin supply portion into the tube bodies at supply rate of 135 g/min and was mixed with the carbon fibers. Next, the mixture was sprayed and fixed on the breathable support which was provided immediately below the tube bodies and continuously transported in one direction at a transport rate (V1) of 0.7 m/min. As a result, the random mat was obtained. In this manufacturing method, no transport tube was used. Since the tube bodies were provided immediately below the cutter, the carbon fibers cut by the cutter only fell in the vertical downward direction until they reached the tube bodies.

Regarding the tube bodies, 13 tube bodies were disposed in a direction (TD direction) perpendicular to the transport direction (MD direction) of the breathable support at an interval of 100 mm between the centers of the tube bodies to form the tube body unit. This tube body unit was reciprocated in the TD direction at a swinging rate (V2) of 9 m/min and a swinging amplitude (W2) of 110 mm. At this time, the ratio V2/V1 of the swinging rate (V2) to the transport rate (V1) was 12.9, and the swinging amplitude (W2) was set to be more than half (50 mm) of the pitch (100 mm) between tube bodies adjacent to each other.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 75% with respect to the total amount of the carbon fibers in the random mat, and the coefficient of variation (CV3') was 3.2%. When the total areal weight of the random mat was investigated, the average value of the total areal weights was 3650 g/m$^2$, and the coefficient of variation (CV1') was 5.2%. When the carbon fiber volume fraction (Vf) of the random mat was investigated, the average value of the carbon fiber volume fractions (Vf) was 35.6%, and the coefficient of variation (CV2') was 3.7%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained. The carbon fiber composite material was formed of a single layer, and the thickness thereof was 2.6 mm.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 74% with respect to the total amount of the carbon fibers in the carbon-fiber-reinforced resin composite material, and the coefficient of variation (CV3) was 3.4%. When the total areal weight of the carbon-fiber-reinforced resin composite material was investigated, the average value of the total areal weights was 3600 g/m$^2$, and the coefficient of variation (CV1) was 3.6%. When the carbon fiber volume fraction (Vf) of the carbon-fiber-reinforced resin composite material was investigated, the average value of the carbon fiber volume fractions (Vf) was 35.6%, and the coefficient of variation (CV2) was 7.0%. In addition, when the tensile strength of the carbon-fiber-reinforced resin composite material was investigated, the average value of the tensile strengths was 336 MPa, the coefficient of variation (CV4) was 7.6%, and a ratio thereof to CV4 of Comparative Example 1 was 43%. Further, when the fluidity of the carbon-fiber-reinforced resin composite material during molding was investigated, the average value of the flow lengths during molding was 25 mm, the coefficient of variation (CV5) was 6.4%, and a ratio thereof to CV5 of Comparative Example 1 was 35%. The number of surface convex portions formed on both surfaces of the press-molded product during molding was 0.

The evaluation results of the random mat and the carbon-fiber-reinforced resin composite material are collectively shown in Table 1. Likewise, the evaluation results of the random mats and the carbon-fiber-reinforced resin composite materials obtained in the following Examples are also shown in Table 1.

Example 2

As the carbon fibers, carbon fibers "TENAX (registered trade name) STS40-24KS (manufactured by Toho Tenax Co., Ltd.; average fiber diameter: 7 µm, fiber width: 10 mm) were widened to a fiber width of 20 mm and were further separated at an interval of ⅕. Using a rotary cutter as a cutter, the carbon fibers were cut in a fixed fiber length of 20 mm. Next, the cut carbon fibers were supplied to tube bodies, which were provided immediately below the cutter, at a supply rate of 58 g/min, and were opened by blowing compressed air thereto from pores in the tube bodies. Concurrently, nylon 6 resin A1030 (manufactured by Unitika Ltd.) as a matrix resin was supplied from a resin supply portion into the tube bodies at supply rate of 73 g/min and was mixed with the carbon fibers. Next, the mixture was sprayed and fixed on the breathable support which was provided immediately below the tube bodies and continuously transported in one direction at a transport rate (V1) of 0.7 m/min. As a result, the random mat was obtained. 10 tube bodies were disposed in one row at a pitch of 200 mm in a direction (TD direction) perpendicular to the transport direction (MD direction) of the breathable support, and 4 rows of tube bodies were disposed parallel to each other by setting the pitch between the rows as 200 mm and setting the phase difference between the rows as 50 mm. As a result, 40 tube bodies formed the tubular body unit. The minimum value of the distance (X1) between the centers of the tube bodies adjacent to each other was 200 mm which was determined such that the carbon fibers and the thermoplastic resin, which were sprayed through the tube bodies adjacent to each other, were not mixed with each other in air before fixed on the breathable support. Further, the phase difference (P1) between the tube bodies in the width direction (TD direction) was 50 mm which was narrower than half of the average spray width (W1; 180 mm) of the obtained random mat.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 74% with respect to the total amount of the carbon fibers in the random mat, and the coefficient of variation (CV3') was 4.5%. When the total areal weight of the random mat was investigated, the average value of the total areal weights was 3600 g/m$^2$, and the coefficient of variation (CV1') was 6.9%. When the carbon fiber volume fraction (Vf) of the random mat was investigated, the average value of the carbon fiber volume fractions (Vf) was 35.1%, and the coefficient of variation (CV2') was 4.6%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 77% with respect to the total amount of the carbon fibers in the carbon-fiber-reinforced resin composite material, and the coefficient of variation (CV3) was 4.4%. When the total areal weight of the carbon-fiber-reinforced resin composite material was investigated, the average value of the total areal weights was 3580 g/m$^2$, and the coefficient of variation (CV1) was 4.9%. When the carbon fiber volume fraction (Vf) of the carbon-fiber-reinforced resin composite material was investigated, the average value of the carbon fiber volume fractions (Vf) was 35.4%, and the coefficient of variation (CV2) was 8.8%. In addition, when the tensile strength of the carbon-fiber-reinforced resin composite material was investigated, the average value of the tensile strengths was 328 MPa, the coefficient of variation (CV4) was 9.1%, and a ratio thereof to CV4 of Comparative Example 1 was 52%. Further, when the fluidity of the carbon-fiber-reinforced resin composite material during molding was investigated, the average value of the flow lengths during molding was 22 mm, the coefficient of variation (CV5) was 8.6%, and a ratio thereof to CV5 of Comparative Example 1 was 47%. The number of surface convex portions formed on both surfaces of the press-molded product during molding was 1.

Example 3

As the carbon fibers, carbon fibers "TENAX (registered trade name) STS40-24K (manufactured by Toho Tenax Co., Ltd.; average fiber diameter: 7 μm, fiber width: 10 mm) were widened to a fiber width of 20 mm and were further separated at an interval of ⅕. Using a rotary cutter as a cutter, the carbon fibers were cut in a fixed fiber length of 20 mm. Next, the cut carbon fibers were supplied to tube bodies, which were provided immediately below the cutter, at a supply rate of 115 g/min, and were opened by blowing compressed air thereto from pores in the tube bodies. Concurrently, nylon 6 resin A1030 (manufactured by Unitika Ltd.) as a matrix resin was supplied from a resin supply portion into the tube bodies at supply rate of 135 g/min and was mixed with the carbon fibers. Next, the mixture was sprayed and fixed on the breathable support which was provided immediately below the tube bodies and continuously transported in one direction at a transport rate (V1) of 0.7 m/min. As a result, the random mat was obtained. 13 tube bodies were disposed at a pitch of 100 mm in a direction (TD direction) perpendicular to the transport direction (MD direction) of the breathable support to form the tube body unit. Further a leveling device in which needles having a L-shaped tips were disposed on a plate having a width of 1500 mm and a length of 300 mm at a pitch of 20 mm was vertically reciprocated from above the obtained random mat at a frequency of 20 times/min so as to stick into the random mat. As a result, the random mat was leveled.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 69% with respect to the total amount of the carbon fibers in the random mat, and the coefficient of variation (CV3') was 6.4%. When the total areal weight of the random mat was investigated, the average value of the total areal weights was 3650 g/m$^2$, and the coefficient of variation (CV1') was 7.7%. When the carbon fiber volume fraction (Vf) of the random mat was investigated, the average value of the carbon fiber volume fractions (Vf) was 33.8%, and the coefficient of variation (CV2') was 6.6%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 67% with respect to the total amount of the carbon fibers in the carbon-fiber-reinforced resin composite material, and the coefficient of variation (CV3) was 6.9%. When the total areal weight of the carbon-fiber-reinforced resin composite material was investigated, the average value of the total areal weights was 3610 g/m$^2$, and the coefficient of variation (CV1) was 5.7%. When the carbon fiber volume fraction (Vf) of the carbon-fiber-reinforced resin composite material was investigated, the average value of the carbon fiber volume fractions (Vf) was 33.6%, and the coefficient of variation (CV2) was 10.1%. In addition, when the tensile strength of the carbon-fiber-reinforced resin composite material was investigated, the average value of the tensile strengths was 344 MPa, the coefficient of variation (CV4) was 11.0%, and a ratio thereof to CV4 of Comparative Example 1 was 63%. Further, when the fluidity of the carbon-fiber-reinforced resin composite material during molding was investigated, the average value of the flow lengths during molding was 18 mm, the coefficient of variation (CV5) was 7.9%, and a ratio thereof to CV5 of Comparative Example 1 was 43%. The number of surface convex portions formed on both surfaces of the press-molded product during molding was 3.

Example 4

The sample was prepared using the same method as that of Example 1, except that the carbon fibers were cut in a long fiber length of 40 mm using a rotary cutter.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 79% with respect to the total amount of the carbon fibers in the random mat, and the coefficient of variation (CV3') was 4.7%. When the total areal weight of the random mat was investigated, the average value of the total areal weights was 3490 g/m$^2$, and the coefficient of variation (CV1') was 7.1%. When the carbon fiber volume fraction (Vf) of the random mat was investigated, the average value of the carbon fiber volume fractions (Vf) was 35.0%, and the coefficient of variation (CV2') was 4.8%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 80% with respect to the total amount of the carbon fibers in the carbon-fiber-reinforced resin composite material, and the coefficient of variation (CV3) was 4.5%. When the total areal weight of the carbon-fiber-reinforced resin composite material was investigated, the average value of the total areal weights was 3500 g/m$^2$, and the coefficient of variation (CV1) was 4.8%. When the carbon fiber volume fraction (Vf) of the carbon-fiber-reinforced resin composite material was investigated, the average value of the carbon fiber volume fractions (Vf) was 35.0%, and the coefficient of variation (CV2) was 9.3%. In addition, when the tensile strength of the carbon-fiber-reinforced resin composite material was investigated, the average value of the tensile strengths was 310 MPa, the coefficient of variation (CV4) was 10.3%, and a ratio thereof to CV4 of Comparative Example 1 was 59%. Further, when the fluidity of the carbon-fiber-reinforced resin composite material during molding was investigated, the average value of the flow lengths during molding was 11 mm, the coefficient of variation (CV5) was 9.1%, and a ratio thereof to CV5 of Comparative Example 1 was 50%. The number of surface convex portions formed on both surfaces of the press-molded product during molding was 4.

Example 5

The sample was prepared using the same method as that of Example 1, except that the amount of compressed air blowing from 6 tube bodies (even-numbered tube bodies when the tube bodies were numbered 1 to 13 in one direction) among the 13 tube bodies disposed in the TD direction was changed to ⅔ of that of Example 1 and the amount of compressed air blowing from 7 tube bodies (odd-numbered tube bodies when the tube bodies were numbered 1 to 13 in one direction) was changed to 4/3 of that of Example 1.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 74% with respect to the total amount of the carbon fibers in the random mat, and the coefficient of variation (CV3') was 12.1%. When the total areal weight of the random mat was investigated, the average value of the total areal weights was 3590 g/m$^2$, and the coefficient of variation (CV1') was 5.5%. When the carbon fiber volume fraction (Vf) of the random mat was investigated, the average value of the carbon fiber volume fractions (Vf) was 36.2%, and the coefficient of variation (CV2') was 3.6%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 76% with respect to the total amount of the carbon fibers in the carbon-fiber-reinforced resin composite material, and the coefficient of variation (CV3) was 13.1%. When the total areal weight of the carbon-fiber-reinforced resin composite material was investigated, the average value of the total areal weights was 3550 g/m$^2$, and the coefficient of variation (CV1) was 3.7%. When the carbon fiber volume fraction (Vf) of the carbon-fiber-reinforced resin composite material was investigated, the average value of the carbon fiber volume fractions (Vf) was 35.5%, and the coefficient of variation (CV2) was 7.5%. In addition, when the tensile strength of the carbon-fiber-reinforced resin composite material was investigated, the average value of the tensile strengths was 333 MPa, the coefficient of variation (CV4) was 12.2%, and a ratio thereof to CV4 of Comparative Example 1 was 70%. Further, when the fluidity of the carbon-fiber-reinforced resin composite material during molding was investigated, the average value of the flow lengths during molding was 22 mm, the coefficient of variation (CV5) was 10.3%, and a ratio thereof to CV5 of Comparative Example 1 was 56%. The number of surface convex portions formed on both surfaces of the press-molded product during molding was 4.

Example 6

The sample was prepared using the same method as that of Example 2, except that the random mat in which the carbon fibers and the thermoplastic resin were mixed was obtained by operating the device at a carbon fiber supply rate of 29 g/min and at a thermoplastic resin supply rate of 37 g/min.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 72% with respect to the total amount of the carbon fibers in the random mat, and the coefficient of variation (CV3') was 5.1%. When the total areal weight of the random mat was investigated, the average value of the total areal weights was 1870 g/m$^2$, and the coefficient of variation (CV1') was 7.2%. When the carbon fiber volume fraction (Vf) of the random mat was investigated, the average value of the carbon fiber volume fractions (Vf) was 34.1%, and the coefficient of variation (CV2') was 4.9%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 71% with respect to the total amount of the carbon fibers in the carbon-fiber-reinforced resin composite material, and the coefficient of variation (CV3) was 5.5%. When the total areal weight of the carbon-fiber-reinforced resin composite material was investigated, the average value of the total areal weights was 1890 g/m², and the coefficient of variation (CV1) was 4.8%. When the carbon fiber volume fraction (Vf) of the carbon-fiber-reinforced resin composite material was investigated, the average value of the carbon fiber volume fractions (Vf) was 33.9%, and the coefficient of variation (CV2) was 9.1%. In addition, when the tensile strength of the carbon-fiber-reinforced resin composite material was investigated, the average value of the tensile strengths was 311 MPa, the coefficient of variation (CV4) was 10.2%, and a ratio thereof to CV4 of Comparative Example 1 was 58%. Further, when the fluidity of the carbon-fiber-reinforced resin composite material during molding was investigated, the average value of the flow lengths during molding was 10 mm, the coefficient of variation (CV5) was 11.1%, and a ratio thereof to CV5 of Comparative Example 1 was 61%. The number of surface convex portions formed on both surfaces of the press-molded product during molding was 3.

Example 7

The sample was prepared using the same method as that of Example 2, except that the random mat in which the carbon fibers and the thermoplastic resin were mixed was obtained by operating the device at a carbon fiber supply rate of 82 g/min and at a thermoplastic resin supply rate of 158 g/min.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 74% with respect to the total amount of the carbon fibers in the random mat, and the coefficient of variation (CV3') was 5.0%. When the total areal weight of the random mat was investigated, the average value of the total areal weights was 3610 g/m², and the coefficient of variation (CV1') was 6.7%. When the carbon fiber volume fraction (Vf) of the random mat was investigated, the average value of the carbon fiber volume fractions (Vf) was 25.4%, and the coefficient of variation (CV2') was 6.1%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 73% with respect to the total amount of the carbon fibers in the carbon-fiber-reinforced resin composite material, and the coefficient of variation (CV3) was 5.4%. When the total areal weight of the carbon-fiber-reinforced resin composite material was investigated, the average value of the total areal weights was 3560 g/m², and the coefficient of variation (CV1) was 4.6%. When the carbon fiber volume fraction (Vf) of the carbon-fiber-reinforced resin composite material was investigated, the average value of the carbon fiber volume fractions (Vf) was 24.9%, and the coefficient of variation (CV2) was 9.9%. In addition, when the tensile strength of the carbon-fiber-reinforced resin composite material was investigated, the average value of the tensile strengths was 270 MPa, the coefficient of variation (CV4) was 9.8%, and a ratio thereof to CV4 of Comparative Example 1 was 56%. Further, when the fluidity of the carbon-fiber-reinforced resin composite material during molding was investigated, the average value of the flow lengths during molding was 29 mm, the coefficient of variation (CV5) was 7.8%, and a ratio thereof to CV5 of Comparative Example 1 was 43%. The number of surface convex portions formed on both surfaces of the press-molded product during molding was 0.

Example 8

The sample was prepared using the same method as that of Example 1, except that carbon fibers "TENAX (registered trade name) UTS50-24K (manufactured by Toho Tenax Co., Ltd.; average fiber diameter: 7 μm, fiber width: 10 mm) were used as the carbon fibers.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 76% with respect to the total amount of the carbon fibers in the random mat, and the coefficient of variation (CV3') was 3.4%. When the total areal weight of the random mat was investigated, the average value of the total areal weights was 3580 g/m², and the coefficient of variation (CV1') was 4.9%. When the carbon fiber volume fraction (Vf) of the random mat was investigated, the average value of the carbon fiber volume fractions (Vf) was 36.1%, and the coefficient of variation (CV2') was 2.9%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 77% with respect to the total amount of the carbon fibers in the carbon-fiber-reinforced resin composite material, and the coefficient of variation (CV3) was 3.3%. When the total areal weight of the carbon-fiber-reinforced resin composite material was investigated, the average value of the total areal weights was 3560 g/m², and the coefficient of variation (CV1) was 2.9%. When the carbon fiber volume fraction (Vf) of the carbon-fiber-reinforced resin composite material was investigated, the average value of the carbon fiber volume fractions (Vf) was 35.5%, and the coefficient of variation (CV2) was 6.4%. In addition, when the tensile strength of the carbon-fiber-reinforced resin composite material was investigated, the average value of the tensile strengths was 375 MPa, the coefficient of variation (CV4) was 6.6%, and a ratio thereof to CV4 of Comparative Example 1 was 38%. Further, when the fluidity of the carbon-fiber-reinforced resin composite material during molding was investigated, the average value of the flow lengths during molding was 26 mm, the coefficient of variation (CV5) was 5.9%, and a ratio thereof to CV5 of Comparative Example 1 was 32%. The number of surface convex portions formed on both surfaces of the press-molded product during molding was 0.

Example 9

The sample was prepared using the same method as that of Example 1, except that a polycarbonate resin "PANLITE" (registered trade name) L-1225WP (PC) (manufactured by Teijin Ltd.) was used as the thermoplastic resin.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 74% with respect to the total amount of the carbon fibers in the random mat, and the coefficient of variation (CV3') was 4.1%. When the total areal weight of the random mat was investigated, the average value of the total areal weights was 3590 g/m$^2$, and the coefficient of variation (CV1') was 5.3%. When the carbon fiber volume fraction (Vf) of the random mat was investigated, the average value of the carbon fiber volume fractions (Vf) was 36.1%, and the coefficient of variation (CV2') was 3.9%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 73% with respect to the total amount of the carbon fibers in the carbon-fiber-reinforced resin composite material, and the coefficient of variation (CV3) was 4.3%. When the total areal weight of the carbon-fiber-reinforced resin composite material was investigated, the average value of the total areal weights was 3590 g/m$^2$, and the coefficient of variation (CV1) was 3.9%. When the carbon fiber volume fraction (Vf) of the carbon-fiber-reinforced resin composite material was investigated, the average value of the carbon fiber volume fractions (Vf) was 35.9%, and the coefficient of variation (CV2) was 7.6%. In addition, when the tensile strength of the carbon-fiber-reinforced resin composite material was investigated, the average value of the tensile strengths was 339 MPa, the coefficient of variation (CV4) was 8.3%, and a ratio thereof to CV4 of Comparative Example 1 was 47%. Further, when the fluidity of the carbon-fiber-reinforced resin composite material during molding was investigated, the average value of the flow lengths during molding was 9 mm, the coefficient of variation (CV5) was 12.4%, and a ratio thereof to CV5 of Comparative Example 1 was 68%. The number of surface convex portions formed on both surfaces of the press-molded product during molding was 2.

Comparative Example 1

The sample was prepared using the same method as that of Example 1, except that the carbon-fiber-reinforced resin composite material was prepared by fixing the tube body unit without reciprocally swinging it.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 76% with respect to the total amount of the carbon fibers in the random mat, and the coefficient of variation (CV3') was 12.0%. When the total areal weight of the random mat was investigated, the average value of the total areal weights was 3600 g/m$^2$, and the coefficient of variation (CV1') was 15.3%. When the carbon fiber volume fraction (Vf) of the random mat was investigated, the average value of the carbon fiber volume fractions (Vf) was 35.4%, and the coefficient of variation (CV2') was 11.2%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 76% with respect to the total amount of the carbon fibers in the carbon-fiber-reinforced resin composite material, and the coefficient of variation (CV3) was 11.1%. When the total areal weight of the carbon-fiber-reinforced resin composite material was investigated, the average value of the total areal weights was 3570 g/m$^2$, and the coefficient of variation (CV1) was 10.8%. When the carbon fiber volume fraction (Vf) of the carbon-fiber-reinforced resin composite material was investigated, the average value of the carbon fiber volume fractions (Vf) was 34.9%, and the coefficient of variation (CV2) was 13.4%. In addition, when the tensile strength of the carbon-fiber-reinforced resin composite material was investigated, the average value of the tensile strengths was 302 MPa, and the coefficient of variation (CV4) was 17.5%. Further, when the fluidity of the carbon-fiber-reinforced resin composite material during molding was investigated, the average value of the flow lengths during molding was 17 mm, and the coefficient of variation (CV5) was 18.3%. The number of surface convex portions formed on both surfaces of the press-molded product during molding was 15.

The evaluation results of the random mat and the carbon-fiber-reinforced resin composite material are collectively shown in Table 2. Likewise, the evaluation results of the random mats and the carbon-fiber-reinforced resin composite materials obtained in the following Comparative Examples are also shown in Table 2.

Comparative Example 2

The sample was prepared using the same method as that of Comparative Example 1, except that the weight average fiber length of the carbon fibers was adjusted to 0.5 mm by reducing the clearance of the rotary cutter.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 81% with respect to the total amount of the carbon fibers in the random mat, and the coefficient of variation (CV3') was 9.6%. When the total areal weight of the random mat was investigated, the average value of the total areal weights was 3570 g/m$^2$, and the coefficient of variation (CV1') was 14.5%. When the carbon fiber volume fraction (Vf) of the random mat was investigated, the average value of the carbon fiber volume fractions (Vf) was 35.8%, and the coefficient of variation (CV2') was 13.8%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 80% with respect to the total amount of the carbon fibers in the carbon-fiber-reinforced resin composite material, and the coefficient of variation (CV3) was 9.8%. When the total areal weight of the carbon-fiber-reinforced resin composite material was investigated, the average value of the total areal weights was 3580 g/m$^2$, and the coefficient of variation (CV1) was 9.8%. When the carbon fiber volume fraction (Vf) of the carbon-fiber-reinforced resin composite material was investigated, the average value of the carbon fiber volume fractions (Vf) was 35.4%, and the coefficient of variation (CV2) was 15.4%. In addition, when the tensile strength of the carbon-fiber-reinforced resin composite material was investigated, the average value of the tensile strengths was 240 MPa, the coefficient of variation (CV4) was 15.5%, and a ratio thereof to CV4 of Comparative Example 1 was 89%. Further, when the fluidity of the carbon-fiber-reinforced resin composite material during molding was investigated, the average value of the flow lengths during molding was 35 mm, the coefficient of variation (CV5) was 17.0%, and a ratio thereof to CV5 of Comparative Example 1 was 93%. The number of surface convex portions formed on both surfaces of the press-molded product during molding was 2.

Comparative Example 3

The sample was prepared using the same method as that of Comparative Example 1, except that the amount of compressed air blown from the tube bodies and the tube body length were adjusted to be twice of those of Comparative Example 1.

A sample having a width of 1000 mm and a length of 250 mm was cut from the obtained random mat. When the carbon fiber bundle (A) in the random mat was investigated, the critical number of single fibers defined by Expression (b) was 86, the average value of the volume fractions of the carbon fiber bundles (A) was 10% with respect to the total amount of the carbon fibers in the random mat, and the coefficient of variation (CV3') was 14.3%. When the total areal weight of the random mat was investigated, the average value of the total areal weights was 3630 g/m$^2$, and the coefficient of variation (CV1') was 14.9%. When the carbon fiber volume fraction (Vf) of the random mat was investigated, the average value of the carbon fiber volume fractions (Vf) was 35.3%, and the coefficient of variation (CV2') was 10.8%.

In the obtained random mat, the carbon fiber mat was impregnated with the thermoplastic resin under pressure and heating using a continuous impregnating device having a transport rate of 0.7 m/min. As a result, the carbon-fiber-reinforced resin composite material was obtained.

A sample having a width of 1000 mm and a length of 250 mm was cut from the obtained carbon-fiber-reinforced resin composite material. When the carbon fiber bundle (A) in the carbon-fiber-reinforced resin composite material was investigated, the critical number of single fibers defined by Expression (b) was 86, the average value of the volume fractions of the carbon fiber bundles (A) was 11% with respect to the total amount of the carbon fibers in the carbon-fiber-reinforced resin composite material, and the coefficient of variation (CV3) was 14.6%. When the total areal weight of the carbon-fiber-reinforced resin composite material was investigated, the average value of the total areal weights was 3600 g/m$^2$, and the coefficient of variation (CV1) was 10.3%. When the carbon fiber volume fraction (Vf) of the carbon-fiber-reinforced resin composite material was investigated, the average value of the carbon fiber volume fractions (Vf) was 35.7%, and the coefficient of variation (CV2) was 11.1%. In addition, when the tensile strength of the carbon-fiber-reinforced resin composite material was investigated, the average value of the tensile strengths was 354 MPa, the coefficient of variation (CV4) was 15.4%, and a ratio thereof to CV4 of Comparative Example 1 was 88%. Further, when the fluidity of the carbon-fiber-reinforced resin composite material during molding was investigated, the average value of the flow lengths during molding was 4 mm, the coefficient of variation (CV5) was 24.9%, and a ratio thereof to CV5 of Comparative Example 1 was 136%. The number of surface convex portions formed on both surfaces of the press-molded product during molding was 38.

TABLE 1

|  |  | Example 1 | Example 2 | Example 3 | Example 4 | Example 5 |
|---|---|---|---|---|---|---|
| Manufacturing Conditions | Manufacturing Method | (Manufacturing Example 2) | (Manufacturing Example 1) | (Manufacturing Example 3) | (Manufacturing Example 2) | (Manufacturing Example 2) |
|  | Carbon Fibers | STS40-24K | STS40-24K | STS40-24K | STS40-24K | STS40-24K |
|  | Thermoplastic Resin | PA6 | PA6 | PA6 | PA6 | PA6 |

TABLE 1-continued

| | | | | | | | | |
|---|---|---|---|---|---|---|---|---|
| Random Mat | Total Areal Weight | Average Value | [g/m2] | 3650 | 3600 | 3650 | 3490 | 3590 |
| | | CV1' | [%] | 5.2 | 6.9 | 7.7 | 7.1 | 5.5 |
| | Carbon Fiber Volume Fraction (Vf) | Average Value | [%] | 35.6 | 35.1 | 33.8 | 35.0 | 36.2 |
| | | CV2' | [%] | 3.7 | 4.6 | 6.6 | 4.8 | 3.6 |
| | Volume Fraction of Carbon Fiber Bundle (A) | Average Value | [%] | 75 | 74 | 69 | 79 | 74 |
| | | CV3' | [%] | 3.2 | 4.5 | 6.4 | 4.7 | 12.1 |
| | weight average fiber length | Average Value | [mm] | 20 | 20 | 20 | 40 | 20 |
| carbon-Fiber-Reinforced Resin Composite Material | Total Areal Weight | Average Value | [g/m2] | 3600 | 3580 | 3610 | 3500 | 3550 |
| | | CV1 | [%] | 3.6 | 4.9 | 5.7 | 4.8 | 3.7 |
| | Carbon Fiber Volume Fraction (Vf) | Average Value | [%] | 35.6 | 35.4 | 33.6 | 35.0 | 35.5 |
| | | CV2 | [%] | 7.0 | 8.8 | 10.1 | 9.3 | 7.5 |
| | Volume Fraction of Carbon Fiber Bundle (A) | Average Value | [%] | 74 | 77 | 67 | 80 | 76 |
| | | CV3 | [%] | 3.4 | 4.4 | 6.9 | 4.5 | 13.1 |
| | weight average fiber length | Average Value | [mm] | 20 | 20 | 20 | 40 | 20 |
| | Tensile Strength | Average Value | [MPa] | 336 | 328 | 344 | 310 | 333 |
| | | CV4 | [%] | 7.6 | 9.1 | 11.0 | 10.3 | 12.2 |
| | Flow Length during Molding | Average Value | [mm] | 25 | 22 | 18 | 11 | 22 |
| | | CV5 | [%] | 6.4 | 8.6 | 7.9 | 9.1 | 10.3 |
| | Number of Surface Convex Portions in Shaped Product | — | [Portions] | 0 | 1 | 3 | 4 | 4 |

| | | | | Example 6 | Example 7 | Example 8 | Example 9 |
|---|---|---|---|---|---|---|---|
| Manufacturing Conditions | Manufacturing Method | | | (Manufacturing Example 1) | (Manufacturing Example 1) | (Manufacturing Example 2) | (Manufacturing Example 2) |
| | Carbon Fibers | | | STS40-24K | STS40-24K | UTS50-24K | STS40-24K |
| | Thermoplastic Resin | | | PA4 | PA6 | PA6 | PC |
| Random Mat | Total Areal Weight | Average Value | [g/m2] | 1870 | 3610 | 3580 | 3590 |
| | | CV1' | [%] | 7.2 | 6.7 | 4.9 | 5.3 |
| | Carbon Fiber Volume Fraction (Vf) | Average Value | [%] | 34.1 | 25.4 | 36.1 | 36.1 |
| | | CV2' | [%] | 4.9 | 6.1 | 2.9 | 3.9 |
| | Volume Fraction of Carbon Fiber Bundle (A) | Average Value | [%] | 72 | 74 | 76 | 74 |
| | | CV3' | [%] | 5.1 | 5.0 | 3.4 | 4.1 |
| | weight average fiber length | Average Value | [mm] | 20 | 20 | 20 | 20 |
| carbon-Fiber-Reinforced Resin Composite Material | Total Areal Weight | Average Value | [g/m2] | 1890 | 3560 | 3560 | 3590 |
| | | CV1 | [%] | 4.8 | 4.6 | 2.9 | 3.9 |
| | Carbon Fiber Volume Fraction (Vf) | Average Value | [%] | 33.9 | 24.9 | 35.5 | 35.9 |
| | | CV2 | [%] | 9.1 | 9.9 | 6.4 | 7.6 |
| | Volume Fraction of Carbon Fiber Bundle (A) | Average Value | [%] | 71 | 73 | 77 | 73 |
| | | CV3 | [%] | 5.5 | 5.4 | 3.3 | 4.3 |
| | weight average fiber length | Average Value | [mm] | 20 | 20 | 20 | 20 |
| | Tensile Strength | Average Value | [MPa] | 311 | 270 | 375 | 339 |
| | | CV4 | [%] | 10.2 | 9.8 | 6.6 | 8.3 |
| | Flow Length during | Average Value | [mm] | 10 | 29 | 26 | 9 |

TABLE 1-continued

| | | | | | | |
|---|---|---|---|---|---|---|
| Molding Number of Surface Convex Portions in Shaped Product | CV5 — | [%] [Portions] | 11.1 3 | 7.8 0 | 5.9 0 | 12.4 2 |

TABLE 2

| | | | | Comparative Example 1 | Comparative Example 2 | Comparative Example 3 |
|---|---|---|---|---|---|---|
| Manufacturing Conditions | Manufacturing Method | | | Method of Related Art | Method of Related Art | Method of Related Art |
| | Carbon Fibers | | | STS40-24K | STS40-24K | STS40-24K |
| | Thermoplastic Resin | | | PA6 | PA6 | PA6 |
| Random Mat | Total Areal Weight | Average Value | [g/m2] | 3600 | 3570 | 3630 |
| | | CV1' | [%] | 15.3 | 14.5 | 14.9 |
| | Carbon Fiber Volume Fraction (Vf) | Average Value | [%] | 35.4 | 35.8 | 35.3 |
| | | CV2' | [%] | 11.2 | 13.8 | 10.8 |
| | Volume Fraction of Carbon Fiber Bundle (A) | Average Value | [%] | 76 | 81 | 10 |
| | | CV3' | [%] | 12.0 | 9.6 | 14.3 |
| | weight average fiber length | Average Value | [mm] | 20 | 0.5 | 20 |
| Carbon-Fiber-Reinforced Resin Composite Material | Total Areal Weight | Average Value | [g/m2] | 3570 | 3580 | 3600 |
| | | CV1 | [%] | 10.8 | 9.8 | 10.3 |
| | Carbon Fiber Volume Fraction (Vf) | Average Value | [%] | 34.9 | 35.4 | 35.7 |
| | | CV2 | [%] | 13.4 | 15.4 | 11.1 |
| | Volume Fraction of Carbon Fiber Bundle (A) | Average Value | [%] | 76 | 80 | 11 |
| | | CV3 | [%] | 11.1 | 9.8 | 14.6 |
| | weight average fiber length | Average Value | [mm] | 20 | 0.5 | 20 |
| | Tensile Strength | Average Value | [MPa] | 302 | 240 | 354 |
| | | CV4 | [%] | 17.5 | 15.5 | 15.4 |
| | Flow Length during Molding | Average Value | [mm] | 17 | 35 | 4 |
| | | CV5 | [%] | 18.3 | 17.0 | 24.9 |
| | Number of Surface Convex Portions During Molding | — | [Portions] | 15 | 2 | 38 |

INDUSTRIAL APPLICABILITY

In the carbon-fiber-reinforced resin composite material according to the present invention, the unevenness in the total areal weight and the unevenness in the carbon fiber volume fraction (Vf) are suppressed, and the unevenness in shape and mechanical properties during molding can be suppressed at a small pitch. Therefore, excellent moldability and mechanical properties can be exhibited even in a small shaped product or a shaped product having a complex shape. Thus, the present invention can be used as, for example, various automobile parts or precision parts such as electronic products.

The present invention has been described in detail with reference to the specific embodiment. However, it is obvious to those skilled in the art that various changes and modifications can be made within a range not departing from the scope of the present invention.

The present application is based on Japanese Patent Application No. 2015-060975 filed on Mar. 24, 2015, the content of which is incorporated herein by reference.

REFERENCE SIGNS LIST

1: tube body
2: random mat
3: tube body unit
4: breathable support
5: transport direction
6: shaped product
7: flowing component during molding
8: flow length
X1: distance between centers of tube bodies
P1: phase difference
W1: average spray width of random mat

The invention claimed is:

1. A carbon-fiber-reinforced resin composite material comprising:
   carbon fibers including carbon fiber bundles; and
   a thermoplastic resin, wherein
   (1) a coefficient of variation (CV1) of a total fiber areal weight of the carbon-fiber-reinforced resin composite material is 5% or lower,
   (2) a coefficient of variation (CV2) of a carbon fiber volume fraction (Vf) in the carbon-fiber-reinforced resin composite material which is defined by Expression (a) is 10% or lower, and
   (3) a weight average fiber length of the carbon fibers is 1 to less than 40 mm, Carbon Fiber Volume Fraction (Vf)=100×Volume of Carbon Fibers/(Volume of Carbon Fibers+Volume of Thermoplastic Resin)    Expression (a), and wherein, in the carbon fibers included in the carbon-fiber-reinforced resin composite material, a proportion of a carbon fiber bundle (A) comprising a critical number of single fibers defined by Expression (b) or more with respect to the total amount of the carbon fibers is 20 to 99 vol %, and
   a coefficient of variation (CV3) of a volume fraction of the carbon fiber bundle (A) is 5.4% or lower, Critical Number of Single Fibers=600/D    Expression (b)

wherein D represents an average fiber diameter (μm) of the carbon fibers.

2. The carbon-fiber-reinforced resin composite material according to claim 1, having a form of a single layer having a thickness of 0.3 mm or more.

3. The carbon-fiber-reinforced resin composite material according to claim 1, wherein
   the total areal weight is 50 to 20000 g/m².

4. The carbon-fiber-reinforced resin composite material according to claim 1, wherein
   the carbon fiber volume fraction (Vf) is 10% to 60%.

5. The carbon-fiber-reinforced resin composite material according to claim 1, which is used for press-molding.

6. The carbon-fiber-reinforced resin composite material according to claim 1, which is manufactured using an airlaid method.

7. A method of manufacturing the carbon-fiber-reinforced resin composite material according to any one of claims 1 to 6, wherein the carbon-fiber-reinforced resin composite material is manufactured through a random mat, the method including:
   (i) spraying carbon fibers and a thermoplastic resin in a breathable support, which is continuously transported in one direction, through a tube body unit including a plurality of tube bodies;
   (ii) manufacturing a random mat:
      by providing the tube bodies with a phase difference in a transport direction of the breathable support and/or a direction perpendicular to the transport direction of the breathable support;
      by swinging the tube body unit; or
      by leveling the carbon fibers and the thermoplastic resin, which are sprayed through the tube bodies, through mechanical processing; and
   (iii) performing an impregnation treatment on the random mat under pressure and heating.

8. The carbon-fiber-reinforced resin composite material according to claim 1, wherein the weight average fiber length of the carbon fibers is 1 to 20 mm.

9. The carbon-fiber-reinforced resin composite material according to claim 1, wherein the coefficient of variation (CV3) of the volume fraction of the carbon fiber bundle (A) is 5% or lower.

10. The carbon-fiber-reinforced resin composite material according to claim 1, wherein total areal weight of the carbon-fiber-reinforced resin composite material is 3,560 to 20,000 g/m².

11. The carbon-fiber-reinforced resin composite material according to claim 1, wherein the proportion of the carbon fiber bundle (A) to the total amount of the carbon fibers is 20 to 77 vol %.

* * * * *